(12) United States Patent
Parker et al.

(10) Patent No.: US 7,308,414 B2
(45) Date of Patent: Dec. 11, 2007

(54) SYSTEM AND METHOD FOR ANALYZING AN OPERATION OF AN ORGANIZATION

(75) Inventors: Douglas S. Parker, Washington, DC (US); Joseph E. Nash, Washington, DC (US)

(73) Assignee: Pillsbury Winthrop Shaw Pittman LLP, San Francisco, CA (US)

( * ) Notice: Subject to any disclaimer, the term of this patent is extended or adjusted under 35 U.S.C. 154(b) by 0 days.

(21) Appl. No.: 10/840,216

(22) Filed: May 7, 2004

(65) Prior Publication Data

US 2004/0225549 A1 Nov. 11, 2004

Related U.S. Application Data

(60) Provisional application No. 60/468,256, filed on May 7, 2003.

(51) Int. Cl.
*G06F 9/44* (2006.01)

(52) U.S. Cl. .......................................................... 705/7

(58) Field of Classification Search ............... 705/7–10
See application file for complete search history.

(56) References Cited

U.S. PATENT DOCUMENTS

| | | | |
|---|---|---|---|
| 2001/0051913 A1* | 12/2001 | Vashistha et al. | 705/37 |
| 2002/0059093 A1* | 5/2002 | Barton et al. | 705/10 |
| 2002/0069102 A1* | 6/2002 | Vellante et al. | 705/10 |
| 2003/0083912 A1* | 5/2003 | Covington et al. | 705/7 |
| 2003/0158768 A1* | 8/2003 | Maeda | 705/7 |
| 2004/0044551 A1* | 3/2004 | Keefe et al. | 705/7 |

OTHER PUBLICATIONS

Global Sourcing web site, retrieved from [URL: http://www.sourcinginterests.org], dated Aug. 28, 2003.*
"Siemens Business Services Receive Five-Year Contract Extension Providing SieQuence State 2 Solutions to MetLife." Business Wire, p. 2243, Aug. 6, 2002.*
"Noted Outsourcing Expert Joins Craig Claims Management, Ltd." PR Newswire, p. 4178, Jan. 18, 2000.*
"Shaw Pittman Announces Merger with Klein & Martin LLP." Business Wire, Jul. 2, 2001.*
"Notable Technology Outsourcing Specialist Joins O'Melveny & Myers LLP." PR Newswire, Nov. 12, 2002.*
"TBI Announces Opening of European Outsourcing and Metrics Practice at Second Annual IT Service Executive Dinner." PR Newswire, p. 0728NYM005, Jul. 28, 1997.*
"Business Strategy Network Announces Upcoming Conference." Business Wire, p. 1398, Nov. 4, 1998.*
"Technology Partners International (TPI) Partner Program Sets Sail With Successful Launch." PR Newswire, p. 9024, Apr. 4, 2000.*

(Continued)

*Primary Examiner*—Susanna M. Diaz

(57) ABSTRACT

A method for analyzing an operation of an organization, especially in the context of an outsourcing. The method includes decomposing the operation along a value chain containing a plurality of processes, associating a process of the value chain with an element that is subject to the process, and designating a characteristic of the associated process and element. As an example, the element is a device (e.g., PC workstation) that is subject to processes (e.g., customer relationship management). As an example, the characteristic is an actor (e.g., an organization or an outsourcer) responsible for performing at the intersection of the associated process and element.

12 Claims, 29 Drawing Sheets

OTHER PUBLICATIONS

Weir et al. "Don't Just Sign on the Dotted Line." Computer Weekly, p. 39, Mar. 21, 2002.*

Imeson, Michael. "IT Advantage—Source of Success—Outsourcing Is No Longer Limited to Back-Office Functions." Banker, Jul. 1, 2002.*

A book, Technology Outsourcing: A Practitioner's Guide (John Angel ed., The [UK] Law Society 2003); 373 pages.

A book, Strategic Outsourcing: Risk Management, Methods and Benefits (American Management Association 1998); 310 pages.

A book, Information Systems Outsourcing: Myths, Metaphors and Realities (John Wiley Series in Information Systems) (John Wiley & Sons 1993).

A book, Information Technology Outsourcing Transactions; Process Strategies and Contracts (John Wiley & Sons 1996) by John K. Halvey and Barbara Melby.

Presentation slides entitled "Deconstruction and Reconstruction A Change Management Approach for Tearing Down and Building Up IT Organizations through Outsourcing", dated May 7, 2003—21 pages.

Presentation slides entitled "Bridging the Disappointment Gap The Value Chain Approach" by Nagel, et al. dated Aug. 28, 2003, 27 pages.

Presentation slides entitled "Outsourcing Where We've Been, Current Status and Where We Appear to be Headed" by Trevor W. Nagel dated Aug. 27, 2003.

Article entitled "Structuring Outsourcing Transactions" by T. W. Nagel, published by Schulthess in 2003, pp. 1-62.

Exhibit A-1, Responsibility Allotment List and Work Allotment, Shaw Pittman LLP—I(Nov. 1, 1999)—3 pages.

Schedule K—Equipment Responsibility Matrix, Shaw Pittman LLP ( Dec. 1, 1998); 4 pages.

Schedule O—Software Responsibility Matrix—Shaw Pittman LLP (Dec. 1, 1998), 3 pages.

Exhibit A-5 Transactions Services Responsibilities Matrix—Shaw Pittman LLP—(Dec. 21, 2001), 13 pages A-1-A-13.

Schedule N—Equipment and Software Responsibility Matrices—Shaw Pittman LLP—(May 3, 2000), 5 pp. N-1-N-5.

* cited by examiner

| 1 | 2 | 3 | Levels |
|---|---|---|---|
| RELATE | Relationship Management | Internal Customer IT Management | |
| | | External Customer IT Management | |
| | | Relationship Management Technical Support | |
| DEVELOP | Requirements | Business Requirements Development | |
| | | Implementation Requirements Development | |
| | | Solution Development | |
| | | Time and Resources Estimation | |
| | | Solution Approval | |
| | Enterprise IT Architecture | Enterprise IT Architecture Development | |
| | | Domain Architecture Approval | |
| | | Enterprise IT Architecture Approval | |
| | Domain Architecture | Information Architecture Development | |
| | | Application Architecture Development | |
| | | Technology Architecture Development | |
| | | Security Architecture Development | |
| | Standards | Standard Policies Establishment | |
| | | Standards Development | |
| | | Standards Approval | |
| | | Standards Publication | |
| ... | | | |

Figure 1A

| Business Requirements Development |
|---|
| The purpose of the "Business Requirements Development" process is to identify and document the business inputs, outputs and schedule requirements, a well as the actors providing inputs or receiving outputs from the requirements.<br><br>The Business Requirements Development process includes the following activities: |
| 1. Identifying and documenting business stakeholder needs, expectations and constraints; |
| 2. Identifying and documenting business drivers and business interfaces (both internal and external); |
| 3. Identifying and documenting schedule and business case requirements; |
| 4. Transforming stakeholder needs, expectations, constraints, and interfaces into business requirements; |
| 5. Defining constraints for verification and validation; and |
| 6. Providing business requirements to the Implementation Requirements process. |

Figure 1B

| Classes of Elements | | | |
|---|---|---|---|
| Client | Server | Enabler | Application |
| PC | Application Server | Middlebox | Platform Software |
| Desktop | Enterprise Server | ATM Access Switch | Operating System |
| Notebook | Specialized Server | FRAD | Database Manager |
| Subnotebook | AS/400 | Router | Infrastructure Software |
| Terminal | Tandem | LAN Switch | Application Server |
| 3270 | Parallel System | LAN Hub | Batch Processing Tool |
| 5250 | Distributed Server | FEP | Database Admin. |
| Asynch Terminal | Midrange Server | VPN Concentrator | Diagnostic Tool |

Figure 1C

| Example Server Class Span | North America | US | Office XYZ | P2P Telecom | VRU |
|---|---|---|---|---|---|
| | | | | | Key System |
| | | | | | Call Recorder |
| | | | | | Web Conferencing |
| | | | | | Video Conferencing |
| | | | | | Audio Conferencing |
| | | | | | vMail |
| | | | | | PBX |
| | | | | Infrastructure Servers | Database |
| | | | | | Print & Store |
| | | | | Application Server | eMail / Groupware |
| | | | | | General Midrange |
| | | | NW Data Center | Infrastructure Servers | Database |
| | | | | | Print & Store |
| | | | | Application Server | Print |
| | | | | | External |
| | | | | | Tape |
| | | | | | DASD |
| | | | | | eMail / Groupware |
| | | | | | Parallel |
| | | | | | General Midrange |
| | | | | | Tandem |
| | | | | | Enterprise |

Figure 1D

| | Examples | | |
|---|---|---|---|
| Processes | Requirements | Help Desk | Operations |
| | Architecture | Reporting | Service Support |
| | Engineering | Acquisition | Service Delivery |
| | Quality Assurance | Deployment | Security Management |
| | Order Entry | Maintenance | Logistics |
| Technologies | PC | Switch | Database Server |
| | Camera | FRAD | Print/File Server |
| | Scanner | Router | Voice Server |
| | Printer | FEP | CTI |
| | Telephone | Firewall | Wallboard |
| | ATM | Circuit | Predictive Dialer |
| Geographies | United States | Data Center | Europe |
| | Canada | Location Types 1, 2, 3 | Asia |
| | New York | Home | South America |
| | Toronto | Kiosk | Australia |
| Business Units | Corporate Centers | Lending Operations | Investment Operations |
| | Retail Banking | Trading Operations | |

Figure 10

| Value Chain Processes |
|---|
| Network Operations, Capacity Management, Configuration Management, Service Desk Reporting |
| Network Operations |
| Configuration Management, Infrastructure Architecture, Network Engineering |
| Service Desk Reporting, Operational Interaction |

1102

| Term Sheet |
|---|
| Network Service Management: |
| A. Supplier's responsibilities to provide the Services will include: |
| i. Manage and report on the capacity and configuration of the Network. |
| ii. Supplier will act as a single point of contact for the management of the Network. |
| iii. Supplier will maintain Equipment inventories, locations lists, Network diagrams and other Network documentation and information. |
| iv. Supplier will provide such information to Client in an online, self-service, electronic Web format available to Authorized Users. |

| Interaction Template | |
|---|---|
| Description | ▸ Description of the interaction |
| Direction | ▸ Supplier → Customer<br>▸ Customer → Supplier<br>▸ Customer + Supplier |
| Relevant Actors | ▸ Client (names and/or positions)<br>▸ Supplier (names and/or positions) |
| Contents | ▸ Description of document (e.g., text, sample forms, table of contents)<br>▸ Description of meeting (e.g., agenda) |
| Format | ▸ Document (e.g., paper, electronic)<br>▸ Meeting (e.g., telephone, video, in-person) |
| Frequency of Occurrence | ▸ Recurring (e.g., weekly, monthly, etc.)<br>▸ Ad-hoc |
| Iterations Expected | ▸ One<br>▸ Multiple (provide number) |
| Service Measures | ▸ Description of measures (e.g., temporal, availability, quality) |

| | Service Measure | | | Service Level | | | | | |
|---|---|---|---|---|---|---|---|---|---|
| | | | | | | For | | And | |
| Ref. | Name | Definition | Type | Unit | Qualifier | Value | % | Value | % |
| 5.4.3 | Access Request Time | Means the elapsed time between when a Client submits a request for systems and/or data access rights, and the moment that Supplier grants such access rights. | Temporal | Business Days | ≤ | 1 | 95% | 2 | 100% |
| 2.1.1 | Business Solution Inaccuracy | Means, for all solutions delivered by Supplier in response to high-level business requirements, the percentage of such solutions rejected by Client as either insufficient or not adequately addressing the requirements. | Quality | % | ≤ | 10 | 100% | | |

| | Service Measures | Service Levels | | | | | |
|---|---|---|---|---|---|---|---|
| | | Enterprise | Retail | | Loans | | |
| | | | North America | Europe | North America | Europe | Kiosk |
| 1 | RELATE | | | | | | |
| 1.1 | Relationship Management | | | | | | |
| 1.1.1 | Customer Management | | | | | | |
| 1.1.2 | B2B Management | | | | | | |
| 2 | DEVELOP | | | | | | |
| 2.1 | Requirements | | | | | | |
| 2.1.1 | Identify and Document Requirements | | | | | | |
| 2.1.2 | Refine Requirements | | | | | | |
| 2.1.3 | Estimate Time and Resources | | | | | | |
| | Business Solution Delivery Time Accuracy | ≥ 98% | | | | | |
| 2.1.4 | Requirement Approval | | | | | | |
| | Business Solution Inaccuracy | ≤ 10% | | | | | ≤ 2% |
| 2.2 | Enterprise Architecture | | | | | | |
| ••• | | | | | | | |

Figure 22

SYSTEM AND METHOD FOR ANALYZING AN OPERATION OF AN ORGANIZATION

This application claims the benefit of U.S. Provisional Application No. 60/468,256, filed May 7, 2003, which is herein incorporated by reference in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates generally to organizational and business operations and, more particularly, to a system and method for analyzing an operation of an organization, especially in the context of an outsourcing.

2. Background of the Invention

Outsourcing is the delegation of significant business functions to a supplier (or outsourcer). Over the last 15 years, businesses around the world have made outsourcing of information technology functions a standard corporate strategy. Within the past few years, these businesses have also placed increasing emphasis on the outsourcing of indispensable business functions such as human resources, finance and administration, and procurement.

The standard outsourcing paradigm is as follows: "The outsourcer will perform the same services the client previously performed, at the same or a higher level of delivery, for the same or a lower price." Significant is the historical nature of this promise. To fulfill this commitment, outsourcers/suppliers need to understand what the client was previously doing, at what level of performance, and at what cost. While these may seem like appropriate inquiries, experience has shown that obtaining the necessary facts is time consuming, expensive, and subject to potentially divisive negotiations. (As used herein, "client" and "customer" refer to the organization that is outsourcing an operation, which is typically referred to as the customer or client of the supplier/outsourcer and the client or customer of an outsourcing consultant.)

The concept of outsourcing provides clients a business proposition that is hard to ignore. Put simply, the outsourcing industry offers to take over a client's operations (or portions of such operations) and to perform at the same or a higher level of delivery for the same or a lower price. This business case is highly compelling not only for senior executives, but also among the managers in charge of operations currently in vogue to be outsourced (i.e., support organizations such as information technology, human resources, and accounting, as well as line operations such as insurance claims administration, mortgage processing, and retail bank call centers).

Outsourcing provides the reengineering of a business operation with a guarantee on performance. The client determines what functions it would like a qualified supplier to perform and contracts for the provision of those services for a price. As the price or pricing mechanisms are pre-established, the client can focus on the remainder of its operations and leave the change of the outsourced component to the chosen supplier. The client can therefore better meet the challenges of today's competitive and fluctuating markets, which force companies to rapidly acquire the capabilities necessary to deliver best-in-class, risk-mitigated change on-time and on-budget.

With commercial-grade outsourcing now in the middle of its second decade of existence, both early adopters and first-timers expect more out of their outsourcing relationships than a supplier that will maintain the status quo for the contractual term at a reduced cost (assuming costs could be forecasted accurately in the first instance). To appreciate why it has taken this long to come to this seemingly simple conclusion, it is important to understand that, while the theory behind outsourcing is for the customer to specify its desired outputs and to allow the supplier the latitude to produce such outputs as it deems best, it has been with rare exception the theory has been put into practice.

There are many explanations for this, but the most compelling is that leading edge adopters learn to survive by adequately mitigating the risks inherent in change. As one of the largest risks in the earliest outsourcings (generally data processing centers and other information technology based infrastructure responsibilities in the late 1980s and early 1990s) was the supplier's ability to perform adequately, it made sense for the work to be meted out in a highly controlled fashion.

Accordingly, rather than the outsourcing agreements simply describing the supplier's solution to achieve the customer's objectives, a detailed description of the relevant portion of the customer's operation was provided as the basis for the schedule of work. These schedules were highly negotiated. Suppliers did not want to take on more responsibility (read "risk") than their customers otherwise did with their own operations, and customers did not want to be charged additional amounts for services that were being performed by their operations, but somehow did not get written up in the schedule of services.

As each new customer of outsourcing was just as interested in mitigating outsourcing risks as its earliest adopters, the words and the mechanisms supporting the process of outsourcing became de rigueur and, by the mid-1990s, was beginning to look like a commodity. For information technology outsourcing ("ITO"), this produced a set of established services for performing the various components of information technology. These ITO components, or "towers" as they are often referred to, appeared to produce the ability to benchmark the services, which ushered in the inevitable commoditization of the services and focus on price as the primary distinguishing feature between the suppliers' offerings. Over time, this led the outsourcing industry to the conclusion that if the towers were commodities, then by selecting the best supplier for each tower (known as "best-of-breed" sourcing) a customer could develop the best possible delivery engine at the lowest cost.

This tower-oriented, best-of-breed approach to sourcing fails on two important objectives: (1) creating value from their outsourcing arrangements rather than just reducing costs; and (2) shifting from relationships characterized by limited responsibility and accountability to more broadly defined and predictable relationships with their outsourcing suppliers.

Thus, the conventional methods for completing an outsourcing transaction do not achieve these above two objectives for several key reasons, including the schedule of work, the customer objectives, the towers of service, the best-of-breed sourcing, and the governance.

Schedule of Work. These schedules are developed based on what the customer does today. The underlying idea is that if the customer was doing it before, then the supplier should do it tomorrow. These schedules, however, do not accommodate customers who want more or better than what they have today.

By basing the schedule of work on what the customer does today, the customer will still have to articulate what it does today (which is not an insignificant task to perform accurately) and since nothing has otherwise changed, the customer and supplier will still feel compelled to negotiate the wording. Further, the customer will also have to describe, in written form, what else it wants (i.e., the "more" or "better" parts) which will lead to more negotiation.

What is needed is a tool that both customers and suppliers can use to describe the functions to be transferred back and forth.

Customer Objectives. One of the chief complaints heard from outsourcing customers is that their suppliers do not, without additional revenue incentive, voluntarily make meaningful changes to the environment during the term of the agreement. There are two primary reasons for suppliers taking this approach: (1) the practice of defining the schedule of work based on a snapshot of what the customer's operation was previously doing, unless the proposed work specifically includes a well-developed set of change activities; and (2) neither specifying the customer's objectives during the development of the transaction nor developing the basis for future change.

What is needed is a system and method that enables suppliers to add value to a client's business process during the term of the agreement.

Towers of Service. Developed initially for supplier pricing purposes, towers, as the term applies across the spectrum of ITO and Business Process Outsourcing ("BPO"), are generally groupings of either various technologies or other things on which processes are performed. While this has worked well for developing pricing constructs, it has institutionalized within the outsourcing community the belief that the towers are somehow walled-off from one another and therefore safe to source without repercussion.

Unfortunately, this thinking has been a primary contributor to service delivery failure and ultimately customer dissatisfaction. The tower-based mindset results in the foundation activity (i.e., the development of the sourcing strategy) focusing rather simplistically on which tower(s) should be outsourced, rather than taking a hard look at the full spectrum of base processes and analyzing the operation in question to determine the right sourcing disposition to achieve the customer's objectives. Similarly, by cleaving an operation into pieces by outsourcing towers, the processes that span the various towers (of which there are many) are broken and require the customer, as general contractor, to provide the glue to integrate the now separated processes into a single coherent function.

However, even more damaging is the value that is destroyed by this fixation on towers (or, "silos" as others would describe it). Businesses have worked hard to tear down their silos and reap their just rewards. Automobile manufacturers have learned how to pull the development of new cars across their organizational structures to cut by over half the seven or more years it otherwise took to traverse the silos of, for example, marketing, design, engineering, manufacturing, and sales. Financial institutions have learned that brand loyalty is hard to achieve when they force their customers into procuring and managing their services separately such as for retail banking, mortgage banking, and investment banking. What these and other operations have found is that while they may be organized vertically like their organization charts show, the work processes move horizontally across the operation. The key to value creation is through a process-oriented approach, not a tower-based segmentation.

What is needed is a mechanism from which all of the key sourcing decisions across the various stages (i.e., strategy, transaction, and operation) can be made.

Best-of-Breed Sourcing. For varying reasons, customers, their advisors, and even some suppliers like the concept of best-of-breed sourcing. Customers like it because the notion of assembling the best suppliers is thought to produce the best results. Advisors like it because it produces more transactions on which their services can be utilized. In addition, certain suppliers like it because it gives them more opportunities to get their foot in the customer's door.

Unfortunately, from the customer's perspective, the benefits of the concept are rarely achieved. Indeed, a simple assemblage of the best parts does not necessarily make the best result. Imagine the headaches of assembling a car from the perceived best parts from among all of the manufacturers, or building a home from blueprint elements of other houses. What the sum total lacks in each case is the interoperability of the parts and, by default, the customer inherits the problem of making the creation work—generally, the complete opposite of what it had in mind when assembling the collection in the first place.

Customers also find they do not have the stamina to produce the desired number of outsourcing transactions. Outsourcing transactions are notoriously exhausting for an operation and most customers give up on their search for supplier perfection long before reaching their goal.

What is needed is a mechanism to help the customer and its suppliers understand the complexity a planned outsourcing transaction will have on the totality of the operation.

Governance. As outsourcing has grown in popularity, so too have the issues customers and suppliers have in trying to develop symbiotic relationships. To date, the cure for such ails has been to increase the level of governance—for example, more executives, more committees, more meetings, more reports, faster escalation procedures, and streamlined dispute resolution processes. Unfortunately, the types of problems producing the most friction between customer and supplier are not appropriately solved using the corporate governance technique of developing guiding principles.

Consider the example of a supplier with the responsibility to develop, for an ITO customer, an annual infrastructure architecture plan. While the customer might be highly interested in the format and level of detail to be contained in the supplier's architectural document and the supplier might be highly interested in what information the customer is going to make available from which a revised architecture can be developed, current approaches for addressing this issue often do not deal with this level of detail. Rather, the supplier may simply be directed to produce a draft procedure for the interaction as much as twelve months after the outsourcing agreement becomes effective. Without meaningful customer guidance about what to include in the procedure, the resulting draft is often rejected by the customer as useless.

What is needed is a mechanism to allow both customer and supplier to understand the interactions of high importance, as such interactions can either create or destroy value.

BRIEF SUMMARY OF THE INVENTION

The present invention provides a system and method for outsourcing that apply a value chain approach, which facilitates the creation of customer-centric, end-to-end delivery scenarios. In particular, the present invention provides a method for developing sourcing strategies and a method for completing sourcing transactions, which both fit together seamlessly and leverage the power of the value chain. In so doing, the present invention exposes structures with complex, unmanageable linkage requirements and clearly defines the roles, responsibilities, and interactions required of all service delivery components. The invention also properly positions interaction development in the transaction cycle and facilitates the appropriate placement of service measures—on the interactions.

By applying a value chain analysis to an outsourcing, the present invention facilitates the collection of needed data, the assessment and evaluation of potential sourcing strategies, the implementation of specific large-scale outsourcing transactions, and the ongoing monitoring, management and restructuring of existing outsourcing relationships. Instead of focusing merely on historical activities, an embodiment of the present invention starts by decomposing the relevant business practices along a value chain. It then maps these processes to a uniquely created "span" describing the factors of production used in the business processes across a company's geographies and business units. The resulting matrix serves as input to develop a scope or operating model for the proposed outsourcing relationship, interaction models to depict the potentially high-friction contacts between customer and supplier, a service level regime to ensure appropriate levels of performance, and a pricing model relating pricing metrics to service delivery obligations. The result is a customer-supplier relationship organized around how a business actually operates.

An aspect of the present invention provides a method for performing sourcing strategies based on processes defined in a value chain. According to an embodiment, this method involves data collection, information analysis, operating model development, sourcing scenario development, and interaction modeling. In one particular embodiment, the present invention involves mapping a value chain, identifying cross-border linkages (interactions) between a customer and an outsourcer (supplier), and fine-tuning the underlying interaction models accordingly. Because the value chain of processes is not necessarily in sequence, the interaction model explores the processes both from a perspective of order and lower levels of detail. Thus, an interaction model explains, for example, the order in which processes are to be formed and the things passed between the customer and supplier.

Another aspect of the present invention provides a method for performing sourcing transactions based on processes defined in a value chain. This method lays out a deal along the value chain, both operationally and contractually, to help infuse value in the transaction. According to an embodiment, the method involves defining processes (through the value chain), span (as a collection of elements), service levels, interaction modeling, organizational modeling, RFP processing, term sheet processing, and contracting.

Another aspect of the present invention involves decomposing a description of scope into its process-based components, as defined by a value chain. With the scope limited to definitions of the processes, best practices can be maintained and a lingua franca can be developed. The result is increased readability of the scope, which helps ensure full coverage of each process.

According to a further aspect of the present invention, what has traditionally been referred to as scope is divided into three components: processes, span, and actors. The span includes a collection of elements. Each process is associated with an element. Each associated process and element is then associated with an actor. The actor defines who is responsible for operating at the intersection of an associated process and element. Thus, together, the processes, span (as a collection of elements), and actors (assigned to associated processes and elements) define the scope.

According to this aspect of the invention, processes are defined as activities of an organization, which, in the preferred embodiment, correspond to a value chain.

Span is defined as a collection of elements. Preferably, this collection is divided by class expressed within relevant collectors (e.g., geography, business unit, and function).

Elements are the objects that are subject to the processes. In other words, in describing a process, the elements would be the nouns in the process description. For example, an element could be a device (e.g., a PC workstation) on which a process (e.g., customer relationship management technical support) is performed. As another example, an element, such as turkey, could be subject to a variety of different processes for making a sandwich (e.g., procurement, cutting, and assembly).

The elements can be further defined through attributes, which provide customer-specific requirements or specifications for an element. In other words, in describing a process, the attributes would be the adjectives modifying the nouns (elements). The attributes are optional in that a customer may not have any particular requirements for the element (e.g., all that is required for assembling a sandwich is turkey, not a particular type of turkey, such as smoked or roasted).

In a further aspect of the present invention, the processes, span, actors, and their relationships are conveyed through what is referred to herein as a "scope model." A scope model includes a process-span matrix populated with actors. The process-span matrix associates a plurality of processes with a plurality of elements. The actors are listed within the process-span matrix at the intersections of the associated processes and elements. These actors perform the process and element corresponding to the intersection. Thus, as a whole, the scope model links processes and elements together, and facilitates the articulation of responsibility by actors (e.g., client, supplier, and third party). In other words, the scope model defines who is responsible for furnishing which processes and elements, which can serve as the basis for a scope of work.

Another aspect of the present invention associates processes and span, along with a characteristic of the associated process and element. In this manner, in addition to defining scope through the association of actors to associated processes and elements, the present invention can convey other characteristics of an associated process and element. For example, a cost could be associated with an associated process and element, which would indicate the cost of completing the process with the element. In terms of a matrix, costs would therefore be assigned at intersections of processes and elements. The matrix could therefore be used as a cost model. As another example, a number of personnel could be associated with an associated process and element, which would indicate the number of people required to complete a process. In this case, the matrix could be used as a human resources model.

Another aspect of the present invention provides a method for analyzing an operation of an organization, especially in the context of an outsourcing. The method includes decomposing the operation along a value chain containing a plurality of processes, associating a process of the value chain with an element that is subject to the process, and designating a characteristic of the associated process and element.

Another aspect of the present invention provides a method for outsourcing that includes defining a value chain of a plurality of processes and defining a collection of elements. The collection of elements is subject to the plurality of processes. The method associates a process with an element and associates an actor with the associated process and element. The actor furnishes the associated process and element. The method defines a scope for the outsourcing based on the associated actor, process, and element.

Another aspect of the present invention provides a method for outsourcing that includes defining a value chain containing a plurality of processes and defining a collection of elements. The collection of elements is subject to the plurality of processes. The method associates the plurality of processes with the collection of elements and assigns actors for the associated processes and elements. The actors are either an organization, an outsourcer for the organization, or a third party to the organization and the outsourcer. The method identifies, along the value chain, interactions between the organization and the outsourcer, and creates interaction models for the identified interactions.

BRIEF DESCRIPTION OF THE DRAWINGS

FIG. 1A is a table illustrating exemplary levels of depth of an organizational value chain, according to an embodiment of the present invention.

FIG. 1B is a table illustrating an exemplary definition of a third level information technology process, according to an embodiment of the present invention.

FIG. 1C is a table illustrating exemplary basic classes and their associated elements, in the context of information technology, according to an embodiment of the present invention.

FIG. 1D is a table illustrating a portion of an exemplary span depicting a server class, according to an embodiment of the present invention.

FIG. 10 is a schematic diagram that illustrates exemplary supplier responsibility variables in an outsourcing, according to an embodiment of the present invention.

FIG. 11 is a schematic diagram that illustrates a portion of an exemplary term sheet segment, according to an embodiment of the present invention.

FIG. 18 is a table that illustrates examples of the type of information collected for boundary change interactions, according to an embodiment of the present invention.

FIG. 20 is a table that shows exemplary relevant fields associated with given service measures, according to an embodiment of the present invention.

FIG. 22 is a table that shows a method for evaluating resultant service measures against coverage, according to an embodiment of the present invention.

DETAILED DESCRIPTION OF THE INVENTION

Figure 1E:
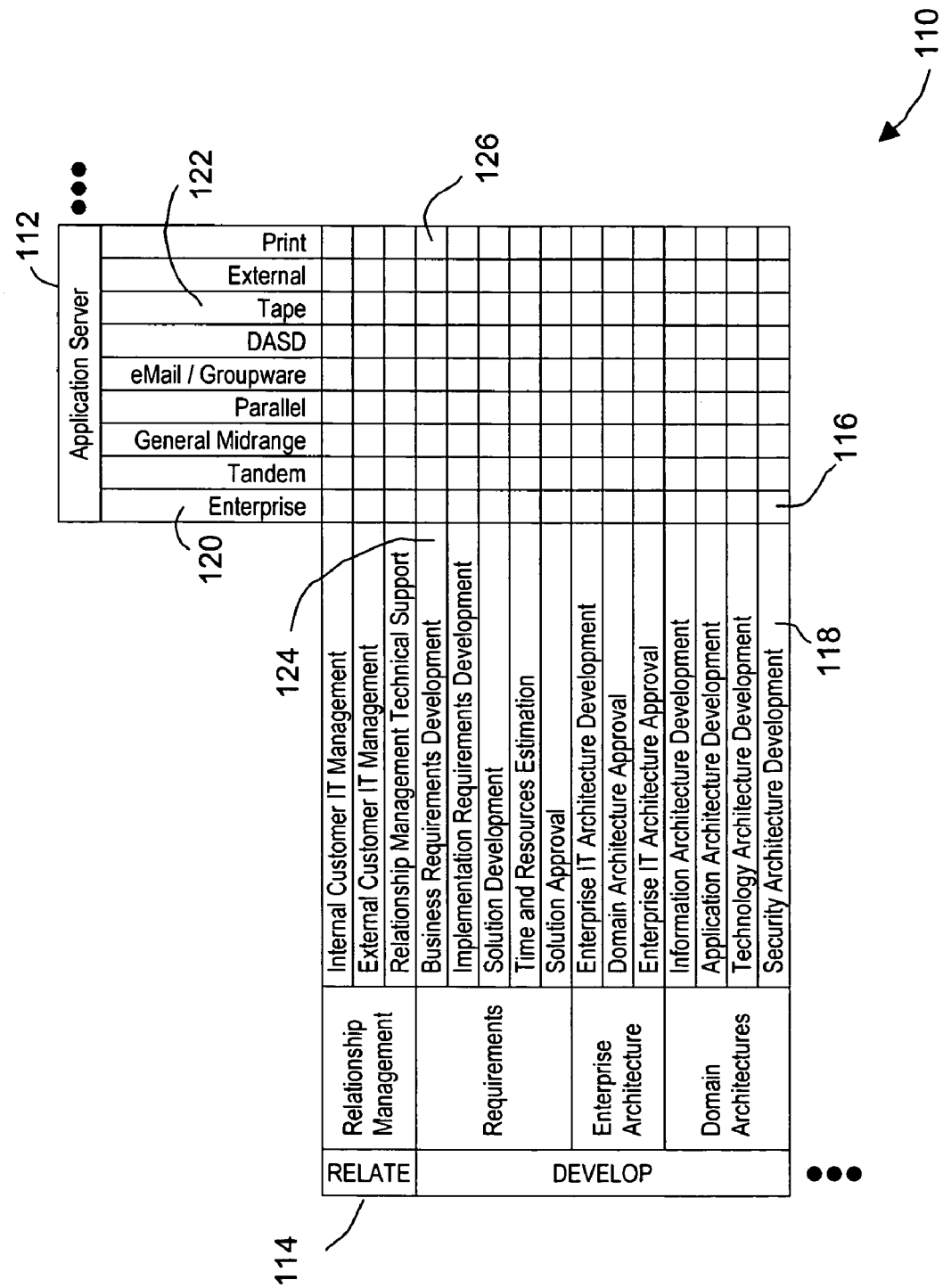
FIG. 1E is a representative portion of an exemplary process-span matrix linking processes of a value chain to a span, according to an embodiment of the present invention.

FIGS. 1A through 8 illustrate an exemplary system and method for outsourcing using a value chain, according to an embodiment of the present invention. Although the outsourcing in this particular example is an outsourcing of information technology, one of ordinary skill in the art would appreciate that the systems and methods described in this example could apply equally well to other outsourcing contexts such as human resources or finance.

According to this embodiment of the present invention, a method for outsourcing includes two main phases: creating a sourcing strategy and completing a sourcing transaction. In the following description of this embodiment, these two phases are first presented separately and then presented jointly to illustrate the overall process for outsourcing.

The value chain is a tool to identify and create value in organizations. The value chain examines activities in a systematic way and facilitates an understanding of how processes relate and interact with each other. This understanding cannot be achieved by looking at an organization as a whole. Instead, the value chain approach examines the many discrete activities each group of an organization performs in designing, producing, marketing, delivering, and supporting the organization's services.

The value chain examines activities (in a systematic way) and how the activities interact. The value chain also disaggregates the organization into its strategically relevant business processes to better understand where opportunity for improvement exists. In addition, the value chain builds the bridge between strategy formulation and implementation.

A key principle of the value chain is that optimization and value creation are a direct result of focusing on the linkages between activities. As an example, a business could fix its human resources department. That business could then shift focus and fix the business' finance department. The result would be an optimized human resources department and an optimized finance department. But, unless the two departments can communicate with each other where it is necessary (e.g., where their activities overlap), their individual optimizations do not add up to the total value that can be obtained for the broader enterprise.

As used herein, a value chain refers to a collection of processes (e.g. actions or operation contributing to an end) performed by an organization or a portion thereof. In an embodiment of the present invention, an organizational value chain is represented by three levels of depth, as illustrated in FIG. 1A. The first, topmost level contains a collection of generic processes (e.g., relate, develop, contact, fulfill, operate, advise, and manage) designed to stratify any organization into successively lower levels of detail. At the second level, the organization's context (e.g., relationship management, requirements, information technology, human resources, finance and administration, and procurement) begins to take shape by identifying the key business functions performed within each of the first level processes. At the third and lowest level of detail, the actual work activities are identified as work processes (e.g., internal customer IT management, network engineering, security administration, and incident management). As an example, an information technology value chain could contain over seventy third level processes.

A preferred embodiment of the present invention applies best practices of suppliers to the value chain processes. For example, wherever possible, the third level value chain processes, and their associated definitions, are developed by identifying the applicable standards-based organizations (e.g., ITIL, PMI, SEI, and ITGI). This approach helps ensure that (1) a comprehensive set of processes are identified to capture fully all of the activities performed by a given organization, and (2) the underlying best practice activities associated with such processes are identified and documented. In accordance with this embodiment, for each third level process, the present invention identifies, in the form of a textual definition, the best practice activities (i.e., the "what" of an operation, not "how" an operation performs). These definitions, used during data collection, operating model design, scope setting, and other sourcing stages, are written as contract-ready modules that can be incorporated, without change, into the term sheets and final agreements. FIG. 1B illustrates an exemplary definition of a third level information technology process.

As used herein, elements are the-objects that are subject to the processes. In the example of an IT outsourcing, elements can refer to the devices, or factors of production, on which the processes are performed (e.g., PCs, telephones, routers, WAN circuits, mainframes, and VRUs). In a further embodiment, a taxonomy of classes is developed to group similar elements. As an example, for information technology, the basic classes (e.g., client, server, enabler, and application) and their associated elements are depicted in FIG. 1C.

As used herein, span represents a collection of elements, which preferably pertains to a specific customer's elements various businesses, geographies, or other constructs. Accordingly, the span is unique for each customer. A small segment of a sample span depicting a server class is shown in FIG. 1D. The span preferably illustrates how elements are perceived logically or physically within the broadest relevant view of an organization. In this manner, the span exposes the pertinent characteristics of the elements for purposes of, for example, designing a strategy for sourcing portions of such elements and various processes or for developing a scope of work to be transferred to an external party.

By linking a customer's span to the appropriate organizational value chain in a matrix-like fashion, it is possible to describe an operation with as much precision as required for a sourcing activity (e.g., "as is" environment, "to be" operating model, scope of service, and service level agreement). Each instance of process-span matrix can portray a particular aspect of sourcing information or activity across the various sourcing phases (e.g., strategy, transaction, and operation). As an example, FIG. 1E shows a representative portion of a process-span matrix 110 linking a span 112 to a value chain of processes 114.

As shown in FIG. 1E, the process-span matrix 110 associates each process of the value chain of processes 114 with elements of the span 112. The intersections, or cells, within the process-span matrix 110 represent-these associations. As an example, intersection 116 represents the association between the security architecture development process 118 and the enterprise application server element 120. By populating the intersections with characteristics of their corresponding associated processes and elements, the process-span matrix 110 can be used to model different aspects of an organization's operation. For example, if the intersections are populated with actors (e.g., customer, supplier, or third party) responsible for the associated processes and elements, then the process-span matrix 110 can be used as a scope model. Thus, in FIG. 1E, if intersection 116 indicates that the supplier is the actor, then the customer and supplier would understand that the supplier was to include the enterprise application server in its development of the security architecture. As another example, the characteristic of an associated process and element could be cost, in which case the intersection would show a cost of furnishing the process and element. In this case, the process-span matrix 110 can be used as a cost model.

In the process-span matrix 110, not all of the intersections are necessarily populated with characteristics of their associated process and element. In some instances, an intersection may represent a nonsensical association between a process and element. Such an intersection is not applicable and is so noted. As an example, in FIG. 1E, if the tape-element 122 is inapplicable to the business requirements development process 124, then the intersection 126 would be so noted.

The value of constructing a process-span matrix, such as the one shown in FIG. 1E, is the resultant simplicity of being able to graphically represent for a specific operation, on just a few sheets of paper, all of the activities it performs (i.e., the value chain) and all of the items that are subject to such activities (i.e., the span). Taking advantage of this result, much information can be depicted/obtained within the construct of this basic model.

For example, the process-span matrix can capture the number of units of any given element. This is accomplished by inserting a blank row directly beneath the elements. As the span is built along each customer's applicable geographic, business unit or other basis, the data gathering template is automatically customized, thereby significantly reducing the recurring problem of both customizing generic templates and completing the collection effort with resources not necessarily directly involved in the template construction process.

As another example, the process-span matrix can capture what the personnel associated with an operation do. This is accomplished by recording the applicable number of personnel (e.g., FTE or full time equivalent) operating at the intersection of a given element and a process (or abstracted levels of either) in the applicable cell(s) on the model.

As another example, the process-span matrix can capture which delivery actor (internal and external) is responsible for performing a particular function. This is accomplished by assigning each delivery actor a particular code (e.g., color) and then coding (sourcing) each of the intersections of elements and processes.

As another example, the process-span matrix can illustrate the coverage provided by a particular service measure/level regime to assist in evaluating whether it provides sufficient coverage for a given scope of work. This is accomplished by (1) interspersing the service measures in question directly beneath the applicable processes that are being measured, (2) abstracting the span to the point where differences in the level of service to be provided are introduced (generally at the geographic or business unit levels), and (3) plotting the service levels for the service measures at the applicable points of intersection.

As another example, the process-span matrix can capture the scope of service (i.e., the applicable intersections of elements and processes) associated with a given pricing construct (internal and external). This is accomplished by assigning each pricing construct (e.g., end-user desktop chargeback, WAN transport, or mainframe CPU minute) a particular code (e.g., color) and then coding the applicable scope of service for each.

As another example, the process-span matrix can capture which associated processes and elements are important to measure. In monitoring the performance of an outsourcer, a customer cannot feasibly measure every process and element furnished by the outsourcer. By designating on the process-span matrix the most important associated processes and elements, a customer can conveniently identify those that will be measured. In this manner, the process-span matrix can be used as a measurement model.

As another example, the process-span matrix can identify how pricing relates to work. For example, the intersections of processes and elements can indicate what charges apply to the furnishing of the associated processes and elements. The process-span matrix, populated with pricing information, can therefore help align supplier-based pricing with the value chain of processes. In this manner, the process-span matrix can be used as a pricing model.

Thus, the basic model comprised of a value chain and a span can be used, for example, to describe for a given operation: what is being done (value chain processes); on what elements the processes are performed (span); how many elements there are; how many personnel do the work; who is responsible; what is the level of performance; and what is included in the cost.

Figure 1F:
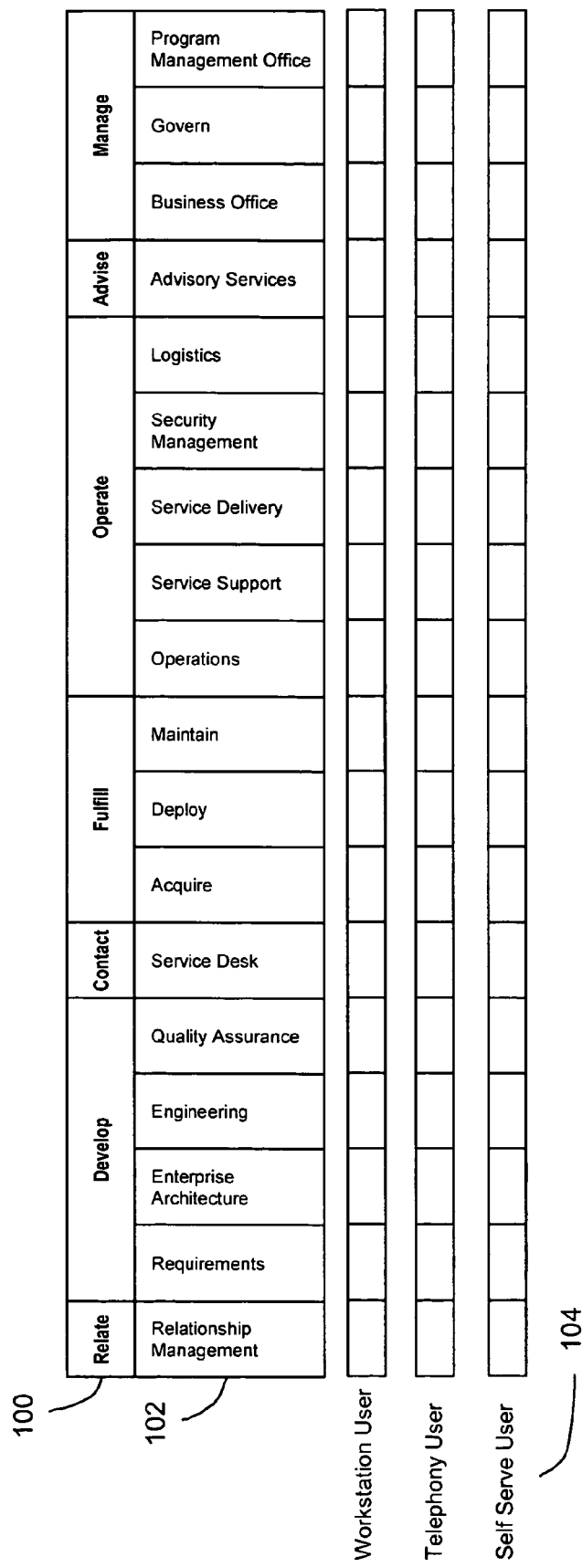
FIG. 1F is a schematic diagram of an exemplary value chain of business processes mapped against customer segments, according to an embodiment of the present invention.

FIG. 1F illustrates an exemplary value chain 100, according to an embodiment of the present invention. In general, a value chain catalogs naturally partitioned groups of activities in a business, operation unit, or support function. In addition, a value chain is preferably versatile such that is works broadly across various types of outsourcings. As shown in the example of FIG. 1F, value chain 100 includes relationship functions, development functions, contact functions, fulfillment, operate, advise, and manage.

Overall, value chain 100 represents the many processes needed for an organization to support an operation, which in this example is an IT function (of course, other value chains, such as for human resources, could be used as needed). In plotting the value chain, the order of the activities does not necessarily reflect their importance. In other words, just because an activity is shown to the left in the value chain does not mean it is of lower value or importance than those shown to the left. Similarly, the order of the activities does not necessarily reflect a temporal order. In other words, the activities shown on the left do not necessarily occur before those shown on the right.

Shown below value chain 100 are business processes 102, which in this example are IT business processes. In general, the business processes of an operation are disaggregated along the value chain to understand the mechanisms and resources used to accomplish the activities and to understand the relationships and interactions needed for inter-operability. Thus, for example, in the value chain 100, development activity is accomplished by getting requirements, building enterprise architecture, performing engineering, and executing quality assurance. As another example, the contact activity is accomplished by the service desk business process, to which end-users typically turn for IT services. As shown in FIG. 1F, the business processes are preferably processes only, without including any requirements for underlying technologies.

As shown in FIG. 1F, the value chain 100 of processes 102 is mapped against a span of elements 104, which in this example are customer segments including a workstation user, a telephony user, and a self-serve user. Self-serve users may be, for example, users that use IT at a bank when they go to an ATM or a website to access services enabled by IT. In general, customer segments (or proxies) are used to represent communities of interest that may require different services or have diverse service delivery mechanisms. These segments can be used and developed as proxies for users of IT services so that data can be gathered about how IT works for these segments.

As shown in FIG. 1F, the process-span matrix that maps the value chain 100 of processes 102 against the elements (customer segments) 104 organizes the resources used in delivering the services at the intersection of each customer segment and business process (e.g., personnel, cost, suppliers, devices, and methods).

With this mapping, an organization can evaluate its allocation of resources. Thus, for example, an organization might ask, "How many people in an IT organization perform as relationship managers with respect to workstation users?" Another question could be "How many people does it take to perform IMACs for workstation users?" Thus, by using a process-span matrix, the organization can determine where its resources are allocated. The organization can also see where cost is added and can even see where suppliers perform activities.

Figure 2:
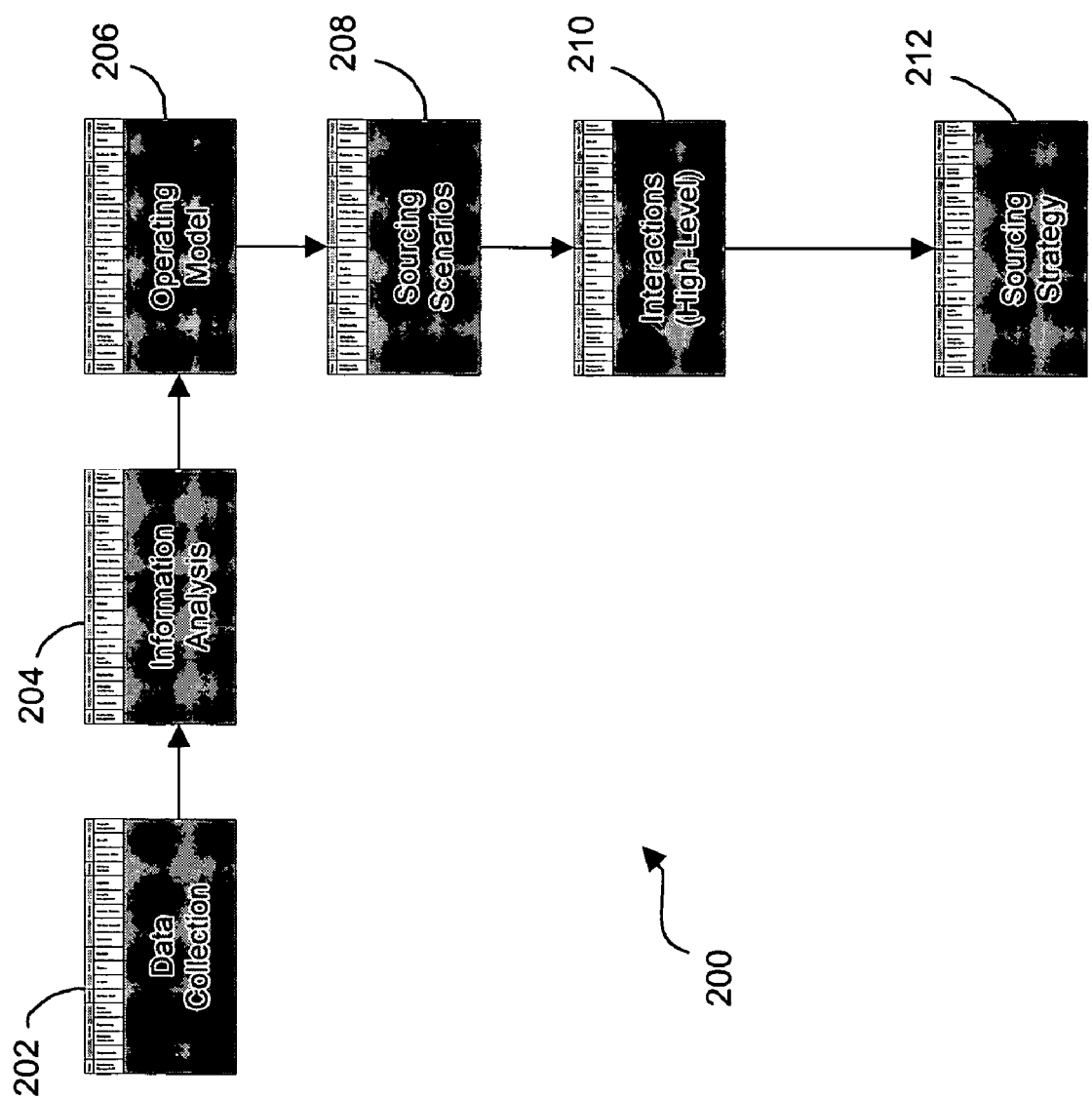
FIG. 2 is a flowchart that illustrates an exemplary method for developing an outsourcing strategy using the process-span matrix exemplified in FIG. 1F, according to an embodiment of the present invention.

FIG. 2 illustrates an exemplary method 200 for developing an outsourcing strategy using the process-span matrix exemplified in FIG. 1F, according to an embodiment of the present invention. This value chain construct facilitates the major strategy components typically encountered in outsourcing, such as data collection 202, information analysis 204, development or refinement of an operating model 206, creation of sourcing scenarios 208, building of the desired high-level interaction model 210, and creation of sourcing strategy 212.

In creating sourcing strategies 212, method 200 leverages the power of the value chain. The creation of sourcing scenarios 208 and the development of operating models 210 drive value, not transactions. Each of the components of method 200 is either collected by, enhanced by, or comes from the value chain.

In developing the operating model and sourcing strategies, the present invention preferably applies certain strategic and transactional principles, as those principles fit within a client's objectives. Exemplary strategic principles include: 1) any required change initiative is of a manageable size and is capable of being completed within an acceptable time frame; 2) services provided are aligned with the ultimate users' needs; 3) operational risk of change initiatives are acceptable (end-to-end); and 4) benefit stream outweighs the cost of change and the level of risk. Exemplary transactional principles include: 1) services are commercially available; 2) services are negotiable in a competitive process; 3) sufficient processes and span are provided for service delivery success; 4) scope of service is designed to reduce the "sole source" effect; and 5) price performance is acceptable.

Figure 3:
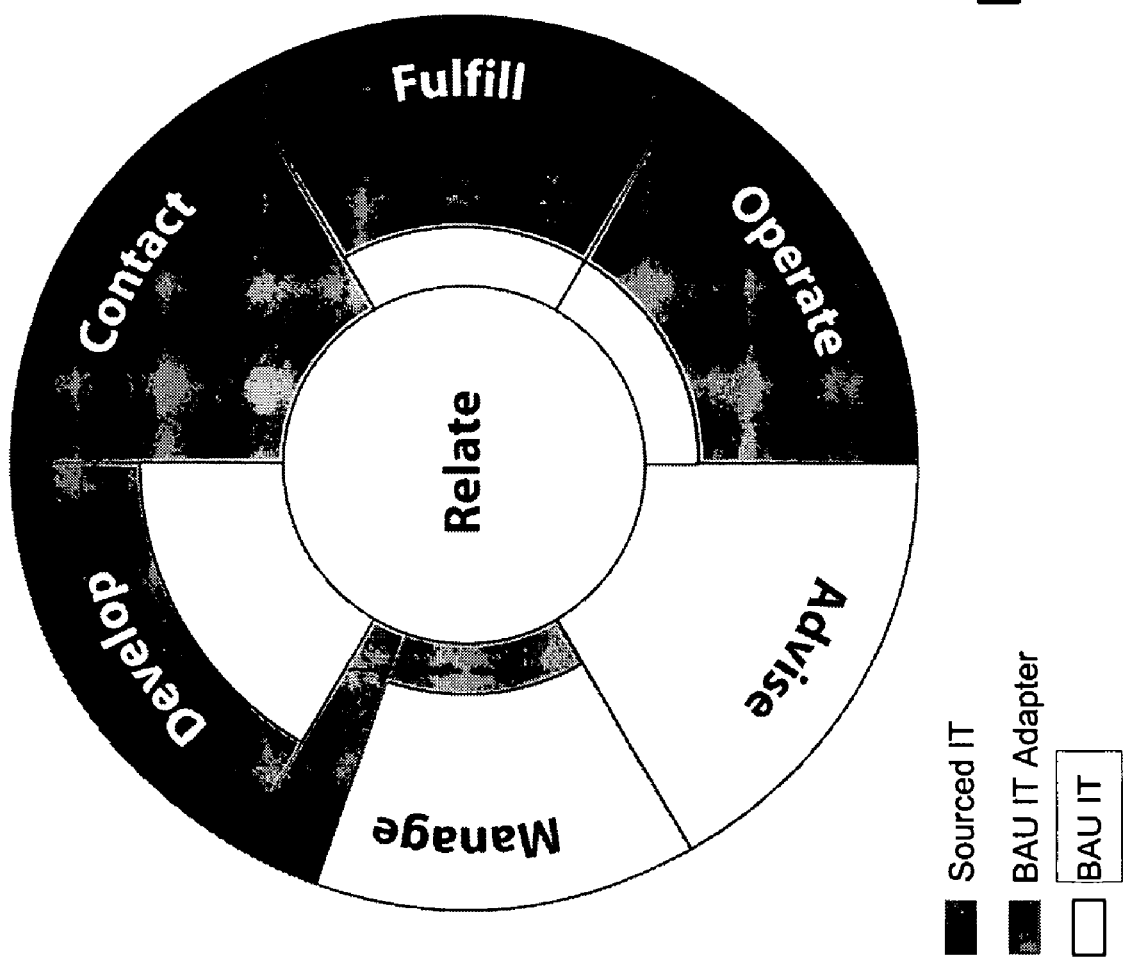
FIG. 3 is a schematic diagram of an exemplary operating model, according to an embodiment of the present invention.

Applying these strategic and transactional principles to a client's objectives yields an operating model, such as the exemplary operating model 300 shown in FIG. 3. Operating model 300 shows the universe of actors, which include business as usual (BAU) IT, adapters, and suppliers (or sourced IT). In general, actors are the entities that perform the processes. The BAU IT is the IT organization of the client. Operating model 300 also shows organizational change, management control, skill-set changes, service delivery design, and interactions with suppliers. By determining what functions a client wants to source, and drawing the operating model to reflect how they perceive the functions inter-relating, an operating model can be built.

Figure 4:
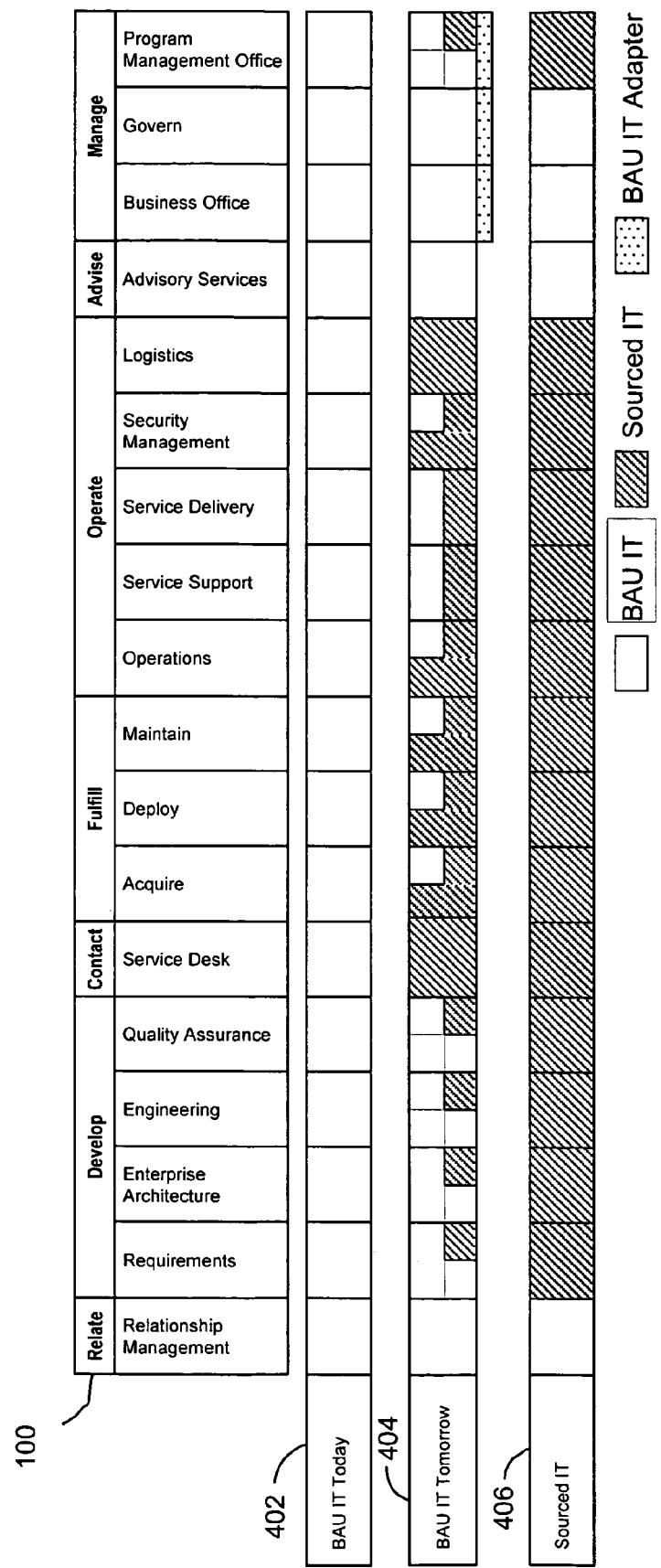
FIG. 4 is a schematic diagram showing the operating model of FIG. 3 plotted along the value chain of processes of FIG. 1F, according to an embodiment of the present invention.

In FIG. 4, the operating model 300 is plotted along the value chain 100 of processes of FIG. 1F. This plot shows the level of complexity associated with a transaction, the distribution of functions among actors, and the areas in which BAU IT must develop actors. The "BAU IT Today" plot 402 indicates all of the functions that the IT organization of the customer currently handles. In other words, before the sourcing, the IT organization manages all of the IT. The "BAU IT Tomorrow" plot 404 and the "Sourced IT" plot 406 indicate the portions of the IT that the BAU IT would push to the supplier through a sourcing.

The supplier receives one hundred percent of the portions pushed to it. But, since a client generally does not dismiss its people in its business office, the supplier typically has to bring in its own people to perform these functions. Plot 406 shows the supplier's value chain with respect to this sourcing. Thus, plots 404 and 406 illustrate where the two organizations (i.e., the client and the supplier) need to relate to one another. Such relations may occur naturally or may need to involve the help of an adapter. An adapter could be needed, for example, in the "manage" portion of the value chain. Nonetheless, plots 404 and 406 indicate which of the two organizations has responsibility for what.

According to the present invention, the approach to performing a sourcing transaction is process driven, rather than technology tower driven. IT is not towers. IT is a collection of processes performed on technologies. The approach also uses an operating model that is based on objectives and interactions, including governance. The operating model focuses on how the client and supplier will operate. Rather than focusing on retained IT and simply saying that whatever is left standing after the sourcing is retained IT, the approach of the present invention focuses on process adapters. There is more impact on the client's functions than just what occurred to the sourced components. Rather than looking at scope on its own (which tends to be too complicated, difficult to read, and hard to modify), the approach of the present invention splits the problem into three pieces: processes, span, and actors. Finally, rather than looking at element-specific measures that do not ensure the end user customer is served, the approach of the present invention focuses on end-to-end measures that are meaningful to such end users. In other words, the present invention looks at customer-focused service measures.

Figure 5:
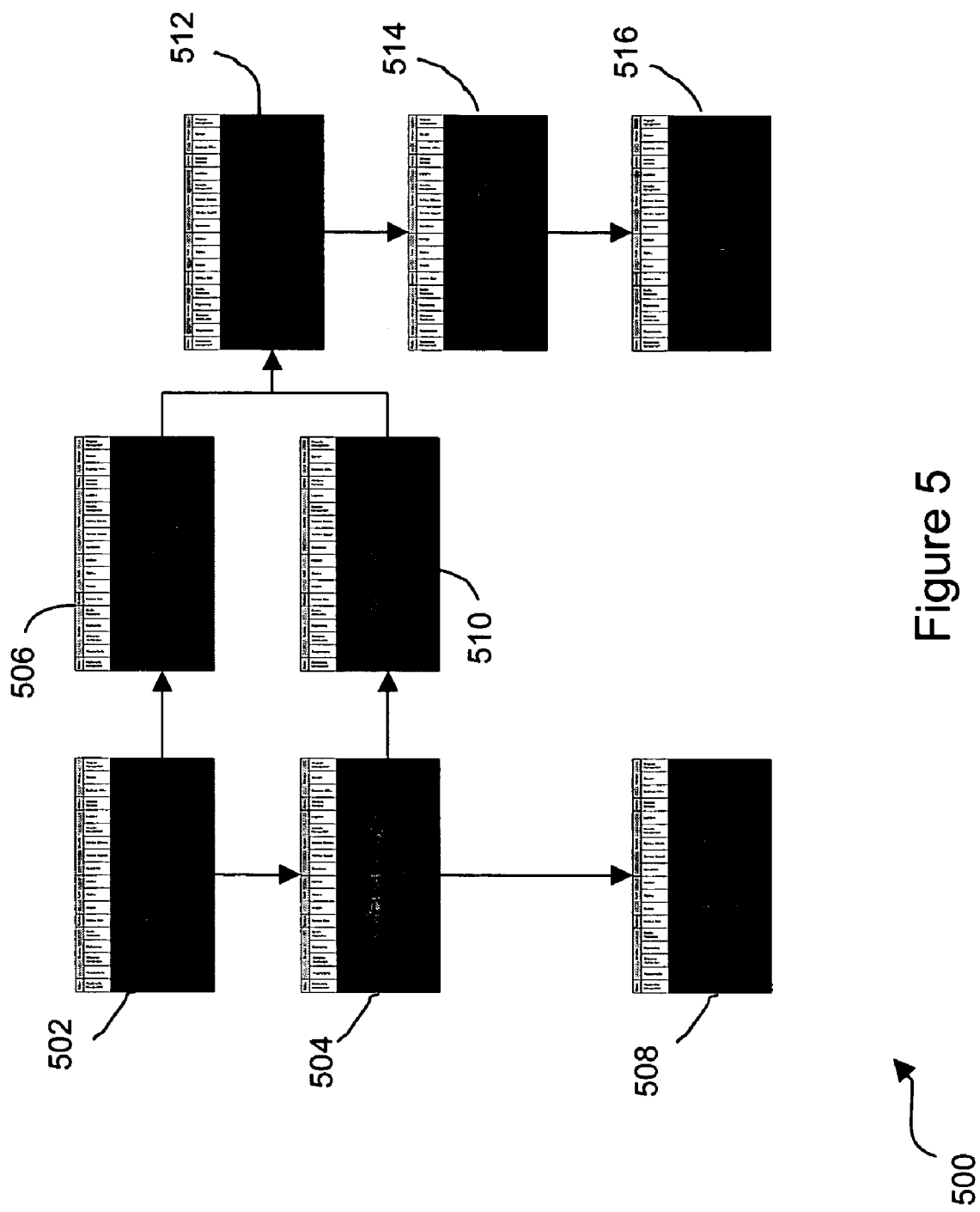
FIG. 5 is a flowchart that illustrates an exemplary method for performing sourcing transactions, according to an embodiment of the present invention.

FIG. 5 illustrates an exemplary method 500 for performing sourcing transactions, according to an embodiment of the present invention. This method 500 helps avoid situations in which a sourcing transaction, despite being based on a good sourcing contract, falls apart due to unworkable relationships between the client and supplier. The value chain construct facilitates major transactional components, including processes, span, service levels, RFP, term sheet, and contract. As shown in the method 500 of FIG. 5, method 500 includes processes definition 502 after which detailed interactions 504 and span definition 506 occur. Organizational model 508 occurs after interactions 504. Service level definition 510 also occurs after interactions 504. Together, the processes definition 502, the span definition 506, the interactions 504, and the service level definition 510 feed into the RFP process 512. The term sheet process 514 follows the RFP process 512. Finally, the contract formation 516 follows the term sheet process 514.

In leveraging the power of value chain, an important aspect of the present invention evaluates processes to perform a transaction. This process orientation minimizes the necessary interactions (handoffs) between the outsourcer and the supplier. The process orientation is also readily adaptive to changes in either the processes or the span. Finally, the process orientation keeps the focus on the customer of the IT and promotes end-to-end service measures.

The processes therefore embody the collection of activities that an organization performs to design, product, market, deliver, and support its product. The processes are real and can be written down. In essence, the processes are how IT gets done.

Figure 6:
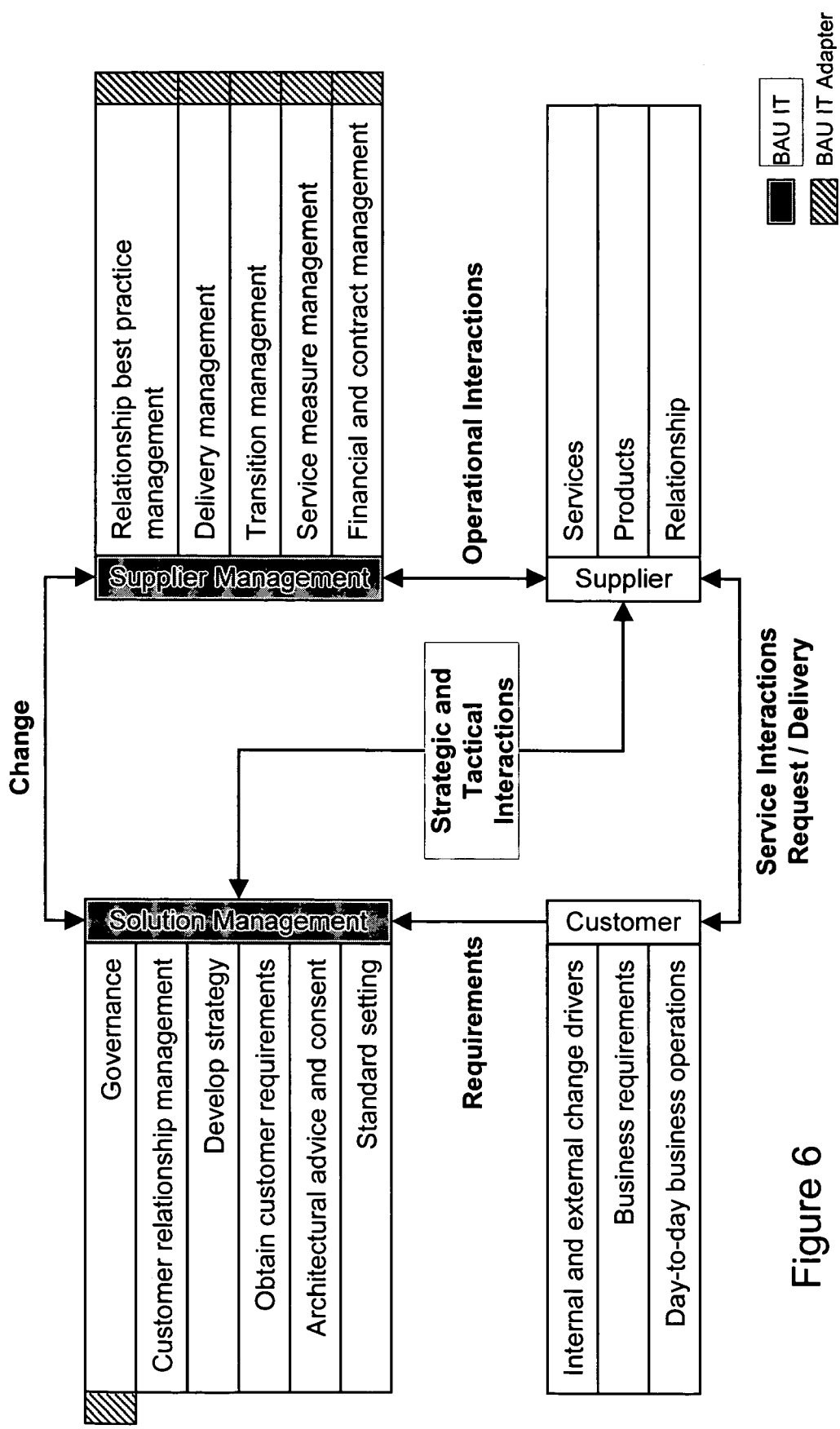
FIG. 6 is a schematic diagram showing exemplary high-level interactions between a customer of IT, the client's solution management, the supplier management functions, and the supplier, according to an embodiment of the present invention.

In an embodiment of the present invention, an operating model is analyzed on an operational level. As an example, FIG. 6 illustrates a diagram showing the high-level interactions between the customer of IT, the client's solution management, the supplier management functions, and the supplier. By sourcing processes, a business transfers previously internal linkages with cross-border linkages. By looking at these transfers along the value chain, a business can expose such cross-border linkages. (interactions) and fine-tune the underlying interaction models accordingly.

In the high-level diagram of FIG. 6, requirements flow up from the business unit, and change requirements are fed to the supplier management function who ensures the supplier inter-operates with the business unit and delivers goods and services back and forth. Orders flow in and services come back. Those are interactions. It is a very high-level set of interactions with a broad set of issues. But that is what is meant by interaction between actors.

In an embodiment of the present invention, performing a transaction involves separating processes and span (collection of elements). In conventional sourcing methods, an organization typically seeks the best practices of the suppliers so that the organization can reduce costs. The organization typically defines the best practices using a traditional scope, which simultaneously tries to describe processes, technologies, geographies, and business units. Unfortunately, the number of variables in the traditional scope makes it unmanageable and confusing.

For example, one scope term may be defined as: "Manage and report on the capacity and configuration of the Network." This scope commingles many processes in the same sentence, including, for example, Network Operations, Capacity Management, Configuration Management, and Service Desk Reporting. This seemingly simple scope definition therefore does not lend itself to being reviewed by subject matter experts, as they would have to read the entire document to piece together the relevant topics.

Thus, in separating the processes and the span, the present invention improves the understanding of all involved parties. As an example, in IT, the processes can include, for example, an incorporation of best practices (e.g., practices as defined by ITIL, PMI, SEI, and ITGI), an identification of areas of important client/supplier interaction, and the creation of a lingua franca for passing responsibility to the supplier. By associating processes with elements of a span, and using best practices from standards-based organizations where they exist (e.g., ITIL, PMI, SEI, and ITGI), the present invention provides a lingua franca for pushing scope to suppliers, which does not have to be negotiated over and over.

The elements of span can be further classified in collectors relevant to the organization, such as the technology, geography, and business units of the organization. By creating the concept of span to represent the technologies as they exist in a client's environment (e.g., a location or business unit), and then simply describing what processes are pertinent to which technologies, the present invention increases the level of visibility of who performs what to any given device.

Figure 7:
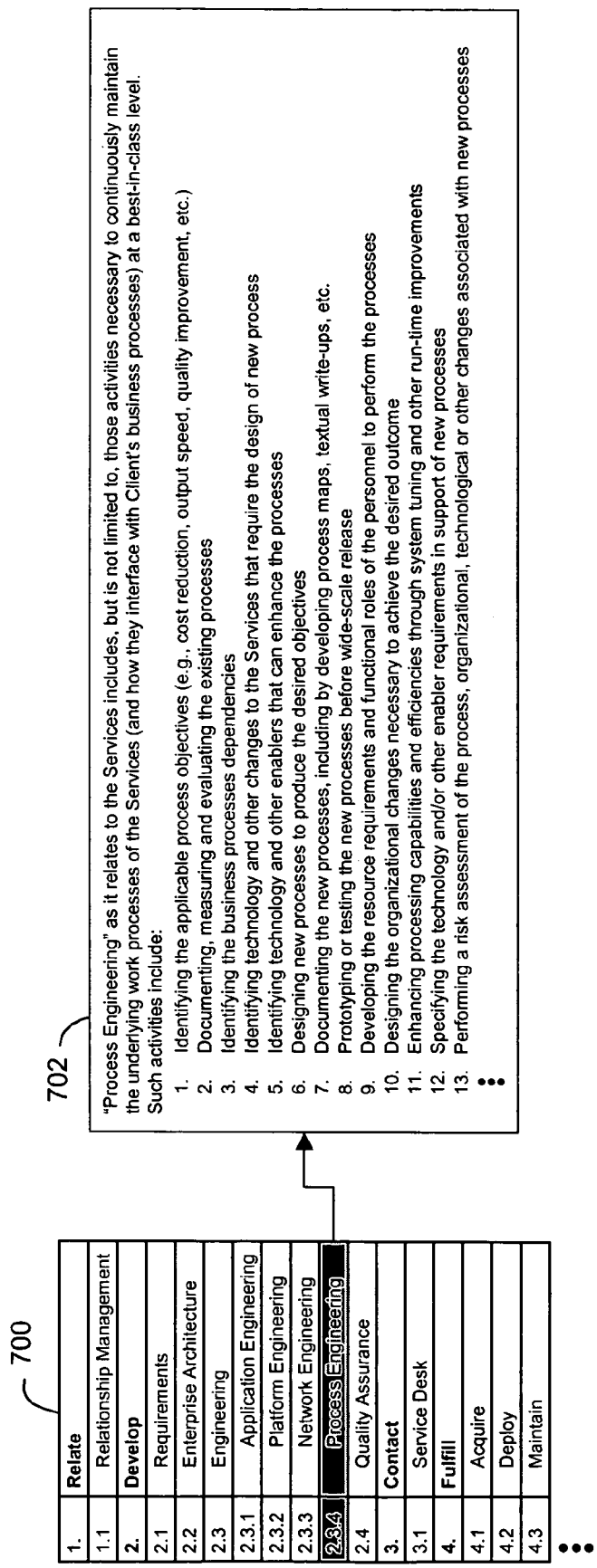
FIG. 7 is a schematic diagram that illustrates an exemplary method for defining IT processes, according to an embodiment of the present invention.

FIG. 7 illustrates an exemplary method for defining IT processes, according to an embodiment of the present invention. Value chain 700 includes some of the detailed activities associated with the IT processes. One such activity is "2.3.4 Process Engineering," which is highlighted in FIG. 7. The detailed activities are further broken down into definitions. FIG. 7 shows a portion 702 of the definition for process engineering. According to an embodiment of the invention, a process definition does not show the technologies to which it will apply or the actor (client or supplier) that will perform the function, as this is described by linking the processes to the elements of the span and assigning characteristics (e.g. actor or cost) to the associated processes and elements (described below).

Figure 8:
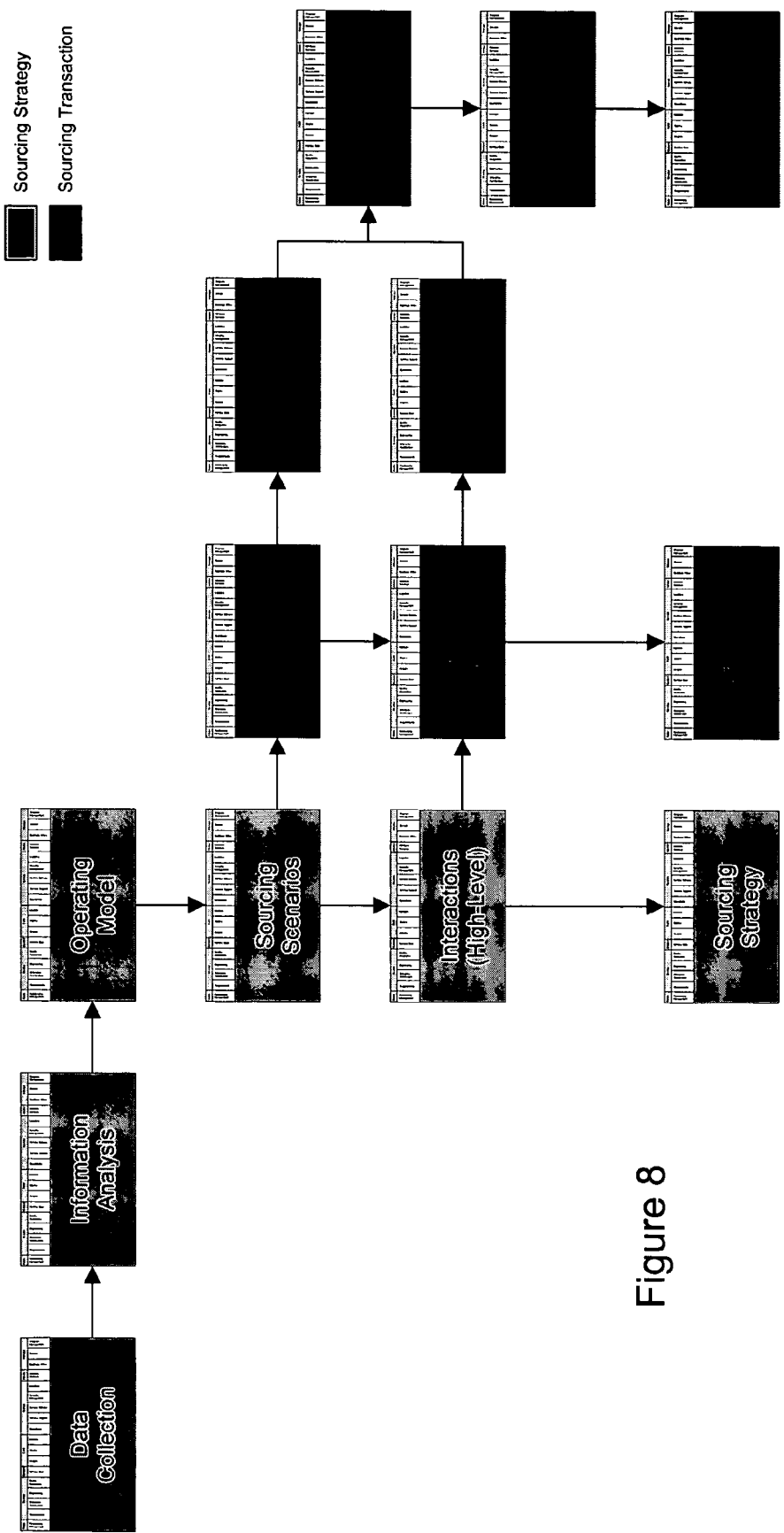
FIG. 8 is a flowchart that illustrates how the exemplary method for creating a sourcing strategy of FIG. 2 and the exemplary method for completing a sourcing transaction of FIG. 5 function together, according to an embodiment of the present invention.

FIG. 8 illustrates how the exemplary method for creating a sourcing strategy of FIG. 2 and the exemplary method for completing a sourcing transaction of FIG. 5 function together. As shown, these methods fit together seamlessly—along the value chain.

Overall, the exemplary value chain approach shown in FIGS. 1A through 8 offers several benefits. In general, the value chain approach avoids the IT-centric, production oriented, siloed, tower view and facilitates the creation of customer-centric, end-to-end delivery scenarios. The value chain approach also exposes structures with complex, unmanageable linkage requirements and clearly defines the roles, responsibilities, and interactions required of all service delivery components. In addition, the value chain approach properly positions interaction development in the transaction cycle and facilitates the appropriate placement of service measures—on the interactions.

The value chain approach is also neutral toward sourcing options. In other words, the approach does not necessarily demand that outsourcing is the answer and it does not demand that not outsourcing is the answer—i.e., the approach is neutral. According to the value chain approach, outsourcing and out-tasking are tools used to unlock or create value—not the objective. Outsourcing activities, when needed, are extensions of the fundamental strategic analysis and operational structuring. In addition, the value chain approach facilitates market-to-market comparison.

The value chain approach also fosters knowledge development. It creates a framework for understanding the service delivery capability and its resource consumption. The approach also enables a lingua franca for the description of scope.

The value chain approach also creates value. It exposes both value creation opportunities and value destroying activities. In this manner, an organization can make informed decisions about transferring processes to suppliers. Only when the organization can achieve results better than those it is currently experiencing will the sourcing make sense.

In providing a method for creating a sourcing strategy, the present invention assists companies in articulating their objectives and then developing the principled rationale for which the underlying work processes ought to be sourced (i.e., give the supplier the processes necessary for them to achieve the desired objectives), rather than using the artificial technology boundaries that result from tower-oriented views. Further, by presenting the sourcing at the process level, the present invention enables a company to understand the linkages that will subsequently bridge across the customer-supplier divide and design the nature of how the interaction is to occur, rather than relying on governance to solve what are primarily process-oriented operational problems.

FIGS. 9 through 23 illustrate in more detail systems and methods for completing a sourcing transaction, according to an embodiment of the present invention. In particular, this embodiment illustrates how processes, as derived from the value chain, and span are linked together in a process-span matrix to define actor responsibilities, and how interaction models can be used to explain detailed client-specific activities that could not be adequately summarized in the process-span matrix.

In accordance with this embodiment, definitions are listed below for terms relating to a sourcing transaction:

As Is, Where Is (AIWI)—Describes what is occurring in a client's operation the moment before an outsourcing becomes effective.

Target Environment Requirements (TER)—Describe a client's objectives. These are not a client's objective of wanting to outsource, but what the client expects to achieve from the sourcing as stated in the form of transition and transformation requirements, defined below. The TER defines what an actor is supposed to develop given its scope of responsibility defined by the scope model. Thus, if it is not entirely clear that executing all of the processes outlined in the scope model would achieve the client's objective, the client uses the TER to describe exactly what it wants. The TER is therefore a document apart from the scope model.

Target Environment Description (TED)—Describes the supplier's solution for providing the "as is," as modified by the client's objectives documented by the TER. In response to receiving a scope model and TER from the client, the supplier creates the TED to describe how the supplier will meet the needs defined by the scope model and TER. The TER is another document that is separate from the scope model.

Transfer—Pertains to all of the activities that lead up to the contract effective date. While this may describe many things (e.g., contract negotiations, and due diligence), at a minimum, it should describe the transfer of knowledge, assets, and people from the client to the supplier.

Transition—Describes the supplier's activities to implement the (primarily) technology changes, but also includes the infusion of their best practices into the operation that will lead to reaching the TED. Examples of this would be server consolidation activities, data center consolidation, and access circuit changes.

Transformation—Pertains to the supplier's activities that will enable, for the client, a new operating model or new business processes (e.g., ensuring that new employees showing up for work have the IT-related tools they need to be productive on the first day rather than ten days later when their PC, telephone, or system access arrives). Transformation would likely be accompanied by reengineering activities that would propel the client forward in, for example, capability, speed, and price, not just doing something differently.

Figure 9:
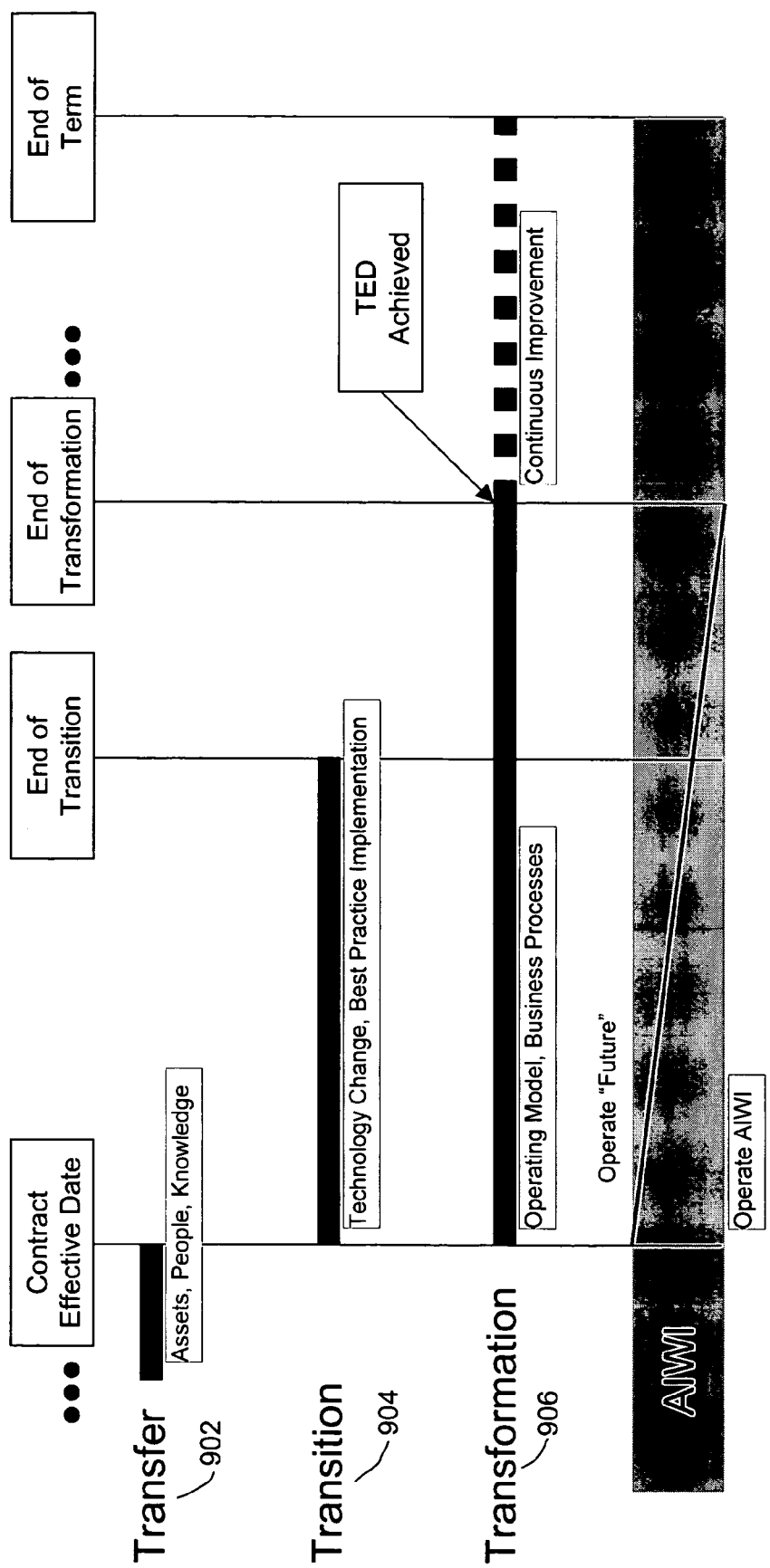
FIG. 9 is a schematic diagram that illustrates a method for determining the rationale and objectives for a desired outsourcing, according to an embodiment of the present invention.

FIG. 9 provides a road map that illustrates a method 900 for determining the rationale and objectives for a desired outsourcing, according to an embodiment of the present invention. As shown, transfer activities 902 occur before the contract effective date. Transition activities 904 (e.g., technology changes, best practices, and implementation) are initiated as of the effective date. Transformation activities 906, depending on client preference and supplier capability (all captured in the contractual documents), might occur as of the effective date or at a later time. Regardless of the timing, when transition activities 904 and transformation activities 906 are complete, the target environment description (TED) will have been achieved. From that point until the contract is over, the ongoing mechanisms for change (e.g., client requirements and technology advances) would result in continuous improvement of the underlying services.

FIG. 10 illustrates the large number of variables that complicate the process of accurately articulating a supplier's responsibilities in an outsourcing. As shown in this example, many degrees of freedom can exist across processes, technologies, geographies, and business units. For example, as shown, to adequately describe process, one must account for variables such as service support, service delivery, security management, and logistics. In other words, the variables of the process describe all of the things that people do.

Clearly, when factoring in the complexities of the technologies in use (e.g., predictive dialers, CTI, telephones, and firewalls) and the client's geographies (e.g., Asia, Europe, and South America) where (a) some or all of the processes are to be performed; (b) where the technologies reside; and (c) for which, of the client's business units, some or all of the processes, technologies, and geographies may apply, it becomes a very complex series of variables to evaluate.

FIG. 11 illustrates portion 1100 of a typical term sheet segment. Typically, it is difficult to get clients to focus on this level of detail. As a result, it takes time to obtain the feedback necessary to fine-tune the words. This difficulty in obtaining a client's feedback typically is not due to the client's not wanting to read the terms. Rather, the difficulty arises because the format of the typical term sheet requires the reader to be knowledgeable about too many functions.

To address this unwieldy format, this embodiment of the present invention decomposes an operation of organization into its process-based components, as shown by the value chain processes 1102. This format increases readability for the client, eliminates the cover-to-cover reading necessary to fully understand a process, and helps ensure full coverage of each process.

To illustrate the advantage of this process-based approach, consider section A(i) of term sheet 1100: "Manage and report on the capacity and configuration of the network." From a process or even organizational perspective, this short sentence is discussing functions that pertain to network operations, capacity management, configuration management, and service desk reporting. Reading and responding to this one portion of text would take people from four different functions. The typical client representative, who is not sufficiently versed in such breadth, is unable to focus on so many functions, especially when similar occurrences are found throughout the entire document.

Plotting this term sheet 1100 segment against the value chain 1102 shows immediately why it is so hard for client's to identify the resources that can read such material. Simply put, while clients would prefer to involve subject matter experts (SMEs), the material is not organized in a manner that makes it possible to hand a group of SMEs the relevant section(s) for their review. Instead, the client must try to pick out the relevant bits and pieces from what are often over one hundred page documents.

Figure 12:
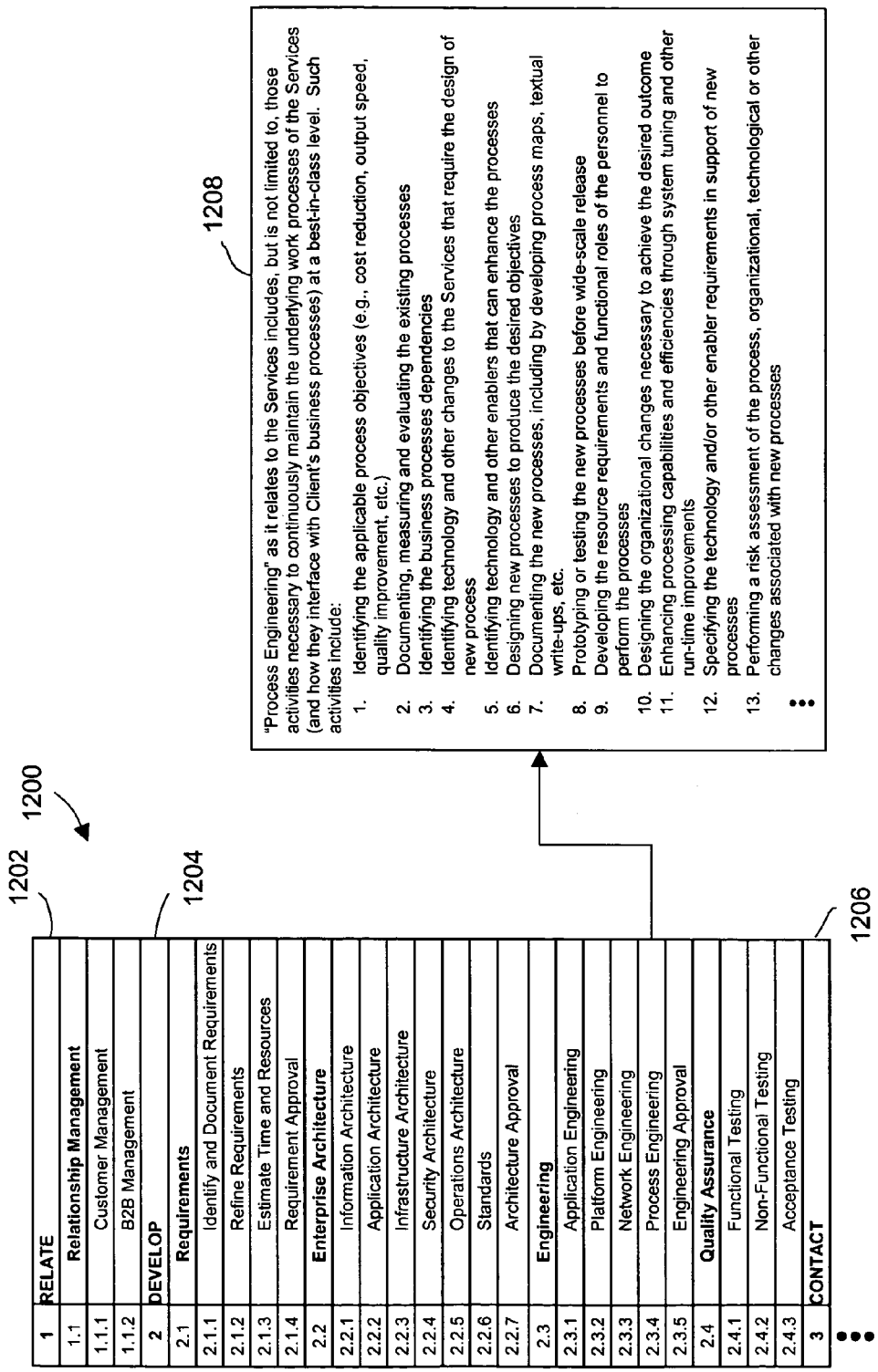
FIG. 12 is a schematic diagram that illustrates a partial view of an exemplary value chain, according to an embodiment of the present invention.

By identifying the processes of an operation and separating those processes from span, best practices can be maintained and a lingua franca can be developed. FIG. 12 illustrates a partial view of a value chain 1200, which shows the underlying processes associated with relate 1202, develop 1204, and contact 1206. In this example, the underlying process of Process Engineering 2.3.4 is broken down to show a description of its associated activities 1208. By developing similar activity descriptions for each of the value chain process, a client could direct its SMEs to review certain processes and be assured that each section contained all of the detail on the subject in question.

In a preferred embodiment of the present invention, the definitions for each of the processes are based, when available, on industry standards, such as practices promulgated by bodies such as SEI, ITGI, ITIL, and PMI (which are standards bodies from the IT industry). Doing so achieves some important outcomes: (1) the client should not have to spend a lot of time determining if the process definitions are adequate; (2) it reduces the likelihood that a client-specific write-up does not include all of the best practice activities; and (3) it virtually eliminates the probability of omitting (for whatever reason) what the client does. Unless there is an unlimited amount of time to focus with the client on producing a truly complete listing of what they do (a very unlikely situation) and knowing that the suppliers almost universally claim that their processes are best-in-class, it is much more accurate and efficient to push responsibility from the client's value chain to the supplier's value chain using standards-based best practice process definitions than to a set of imprecise definitions based on memory and a limited amount of time. Further, since the supplier is going to ultimately use their processes for performing the services (see transition 904 of FIG. 9), then it makes little sense to describe, especially contractually, how AIWI is accomplished.

According to a particular implementation of the present invention, as applied to information technology outsourcings, the performance of information technology functions within an enterprise is described in terms of processes and span. The span is a collection of elements, which can be grouped in collectors and classes. The elements can also have associated attributes.

As discussed above, elements are the objects that are subject to the processes. In an IT outsourcing, elements could be factors of production such as telephones, routers, servers, retail banking applications, a contract with a telephone service provider, or a building that houses a data center.

Attributes are the relevant features of an element. For example, since some routers can be ordered with or without encryption cards, encryption cards could be an attribute of a router if it is important to the transaction (e.g., in terms of pricing, functionality, and capability). Another example of an attribute could be the refresh rate on a workstation. If a customer does not have a preference for a particular type of element, the attribute can be omitted.

Collectors are abstract collections of elements that could themselves possess definitions as well as attributes. For example, wild animals could be a collector, and its elements could be lions, tigers and bears, each with their own definition and attributes. Pulling it all together, wild animals might just be a collector or it might sport a definition (e.g., large predatory animals) that includes (or not) attributes (e.g., large powerful jaws, sharp teeth, and 20/15 vision). As an example relating to IT, a collector could be a server printer or a WAN.

A class is a grouping of elements with certain commonalities. For example, classes could include client elements (e.g., PCs, telephones, and printers), server elements (e.g., mainframes, distributed application servers, and PBXs), enabling elements (e.g., routers, switches, and circuits), application elements (SAP, PeopleSoft, and Oracle), third party (e.g., a subcontractor of the supplier) contract elements, and real estate elements.

Span is a collection of elements. In an embodiment of the present invention, for IT outsourcings, span is a distribution of elements by class expressed within relevant collectors. In this manner, span enables the description in sufficient detail of elements within collectors, within a business unit, and within a geography for an enterprise.

Figure 13:
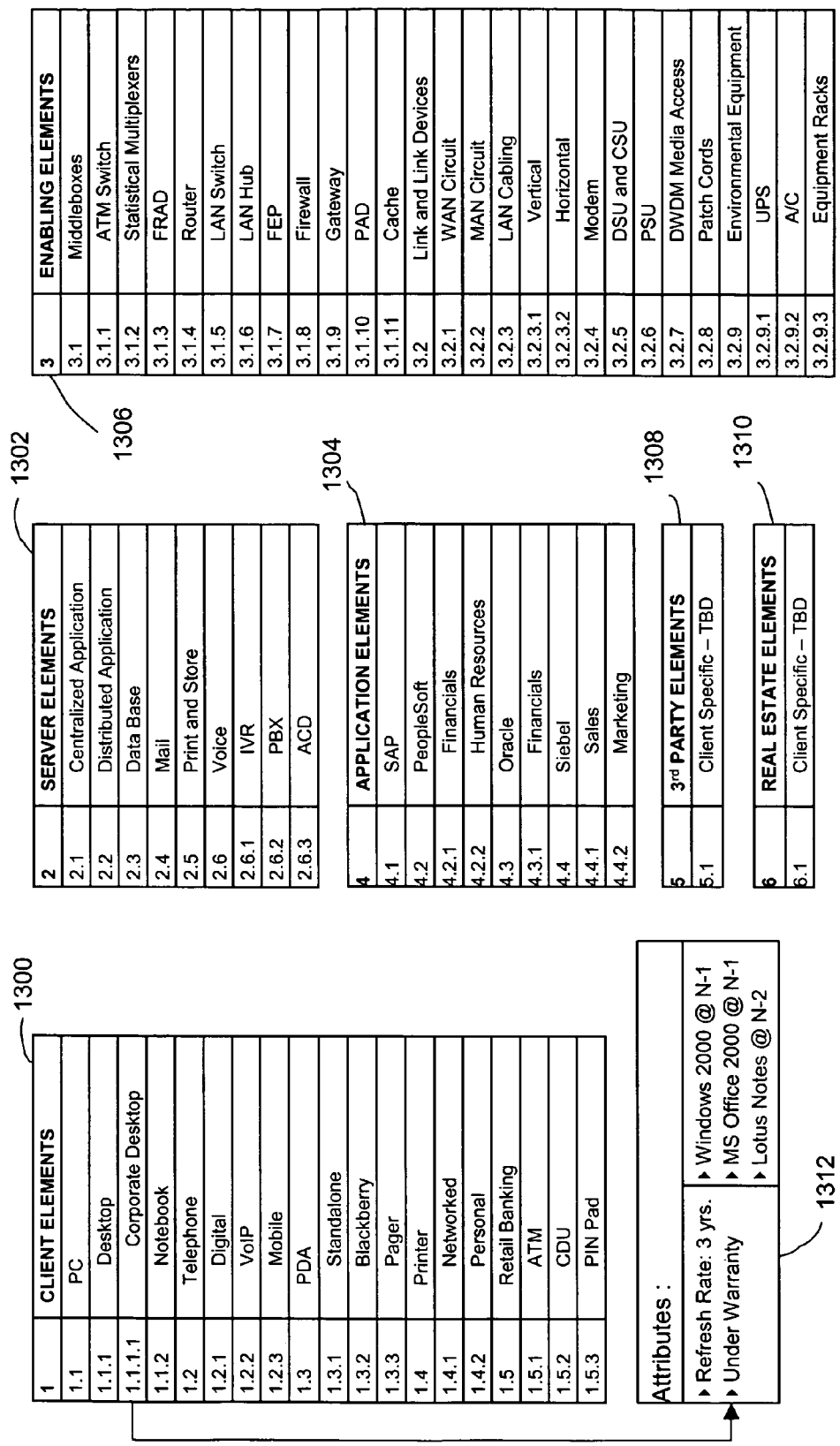
FIG. 13 is a schematic diagram that illustrates exemplary classes in an IT outsourcing, according to an embodiment of the present invention.

FIG. 13 illustrates exemplary classes in an IT outsourcing, according to an embodiment of the present invention. As shown, client elements 1300 include a taxonomy of devices (elements) used by a client's personnel. For a PC, the taxonomy decomposes the element down to a desktop and a notebook. At the desktop level, it further decomposes to a corporate desktop, which might be different from a retail banking desktop (e.g., because one runs under Linux and the other under Windows 2000).

Server elements 1302 decompose into centralized application servers, distributed application servers, database servers, mail servers, and voice servers, each of which could be further decomposed as necessary.

Application elements 1304 are applications such as SAP, PeopleSoft, Oracle, Siebel, and custom applications. If the transaction in question contained an application development or maintenance component, then it would be appropriate to include those applications that would be sourced as application elements. However, if the sourcing were, for example, the mainframe only, then such applications (if run on the sourced mainframe) would be listed as attributes of the mainframe. Unless the supplier was to actually be responsible for the development or maintenance of Windows 2000 (as opposed to its procurement and installation), it would only be listed as an attribute of PC or a server.

Enabling elements 1306 contain elements that, for the most part, connect client elements with server elements (e.g., middleboxes and links and link devices).

Third party elements 1308 are highly client-specific and describe the client's portfolio of suppliers that perform various processes.

Real estate elements 1310 describe what facilities (e.g., buildings, floors, and rooms) are involved in the production of the processes.

Attributes 1312 express a client's standards and requirements for an element. As shown in the example of FIG. 13, the attributes 1312 of a PC could be a refresh rate of every 3 years, that it remains under warranty, that it runs Windows 2000, and that it contains MS Office 2000 and Lotus Notes at N-2.

Figure 14:
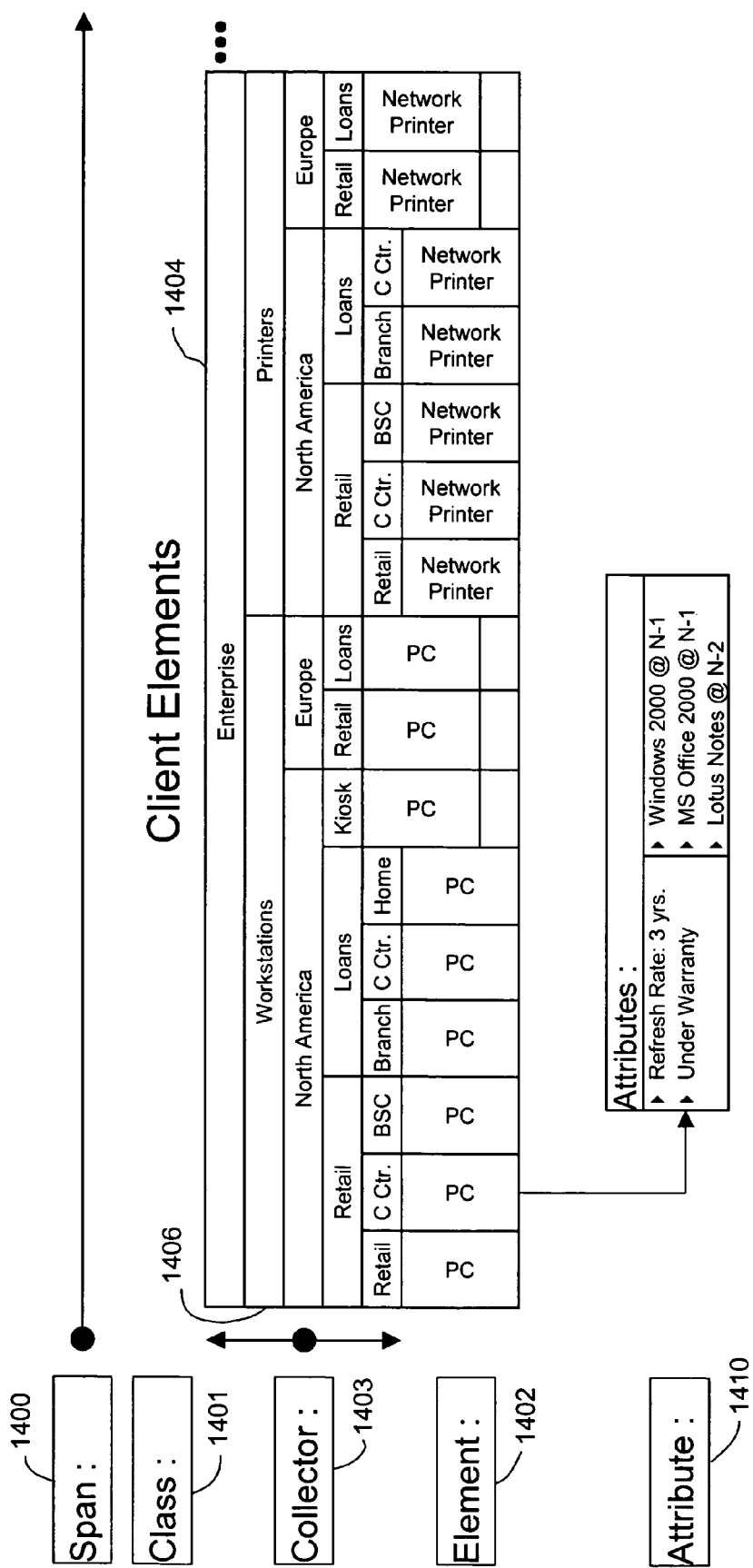
FIG. 14 is a schematic diagram that illustrates an exemplary span encompassing a portion of a client class, which contains client elements, according to an embodiment of the present invention.

FIG. 14 illustrates a span 1400 encompassing a portion of a client class 1401, which contains client elements 1402 (e.g., PCs and network printers). Although span 1400 shows only the client class 1401, other spans would be created for the other classes (e.g., server, application, and enabler—see FIG. 13). Shown above the client elements 1402 are various collectors 1403. The topmost collector 1404 shows the total client enterprise, which is then subdivided into another collector level 1406 including workstations and printers. The workstations are further subdivided into geographies (e.g., North America and Europe), which are further subdivided into a mixture of business units and geographies (e.g., retail, loans, and kiosks). From this point, the business units (e.g., retail and loans) in North America subdivide into business unit components (e.g., retail, call center, and branch service centers) and then terminate with the PC element 1402. The geography (e.g., kiosks) and European business units (e.g., retail and loans) immediately terminate with the PC element 1402. The result is a "ragged edge" of elements 1402 that reflects real world conditions.

Span 1400 shows the PC elements 1402 multiple times in order to capture where there are meaningful differences between the PCs. In this example, the span 1400 suggests that a retail PC is somehow different from a call center PC and the branch service center PC. For example, the differences in the PCs would either be due to their underlying definitions, attributes, or some other feature(s) that made it important to segregate (e.g., location or supplier who serviced the PC).

Thus, as shown in FIG. 14, by defining span as the distribution of elements within their relevant collectors (e.g., geography, business unit, or function), highly complex constructs can be illustrated. The span can be conveniently observed, making examination of the results easier. In addition, the "ragged edges" can be used to reflect real world conditions.

Thus, span 1400 depicts the collectors 1403 and elements 1402 that are necessary to adequately describe a client's environment for a given class 1401. More than likely, to adequately describe the nature of a client's elements 1402, it will be complicated, ragged, and for those with many geographies and/or business units, deep and wide. Although it cannot be seen directly on the span 1400, the attributes 1410 of the elements 1402 will assist in the differentiation of the elements 1402.

Having determined a set of process definitions derived from a value chain and having defined a variety of elements, attributes, classes, and collectors as the span, an embodiment of the present invention establishes the relationship between the processes and the span. In other words, the present invention determines what actions (processes) are to be performed by what devices (elements). In a preferred embodiment, this relationship is established by plotting the process and span on a process-span matrix.

Figure 15:
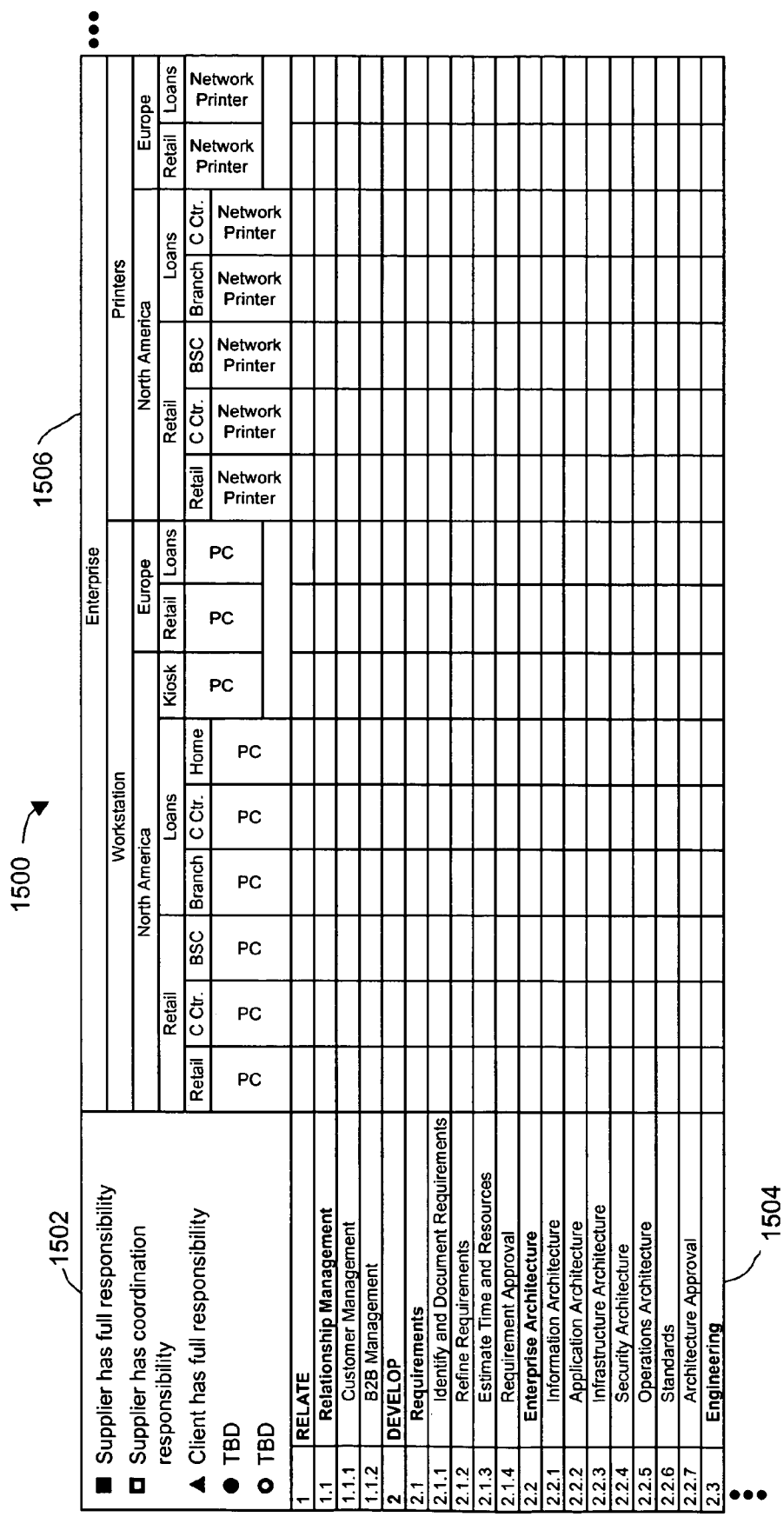
FIG. 15 is an exemplary scope model, according to an embodiment of the present invention.

FIG. 15 illustrates an exemplary scope model 1500 in which the processes 1504 are plotted vertically and the span 1506 is plotted horizontally, and actors are designated at the intersections of the processes 1504 and elements of the span 1506. Linking the processes 1504 and span 1506 together in this manner facilitates the articulation of responsibility by actor (e.g., client, supplier, and third party). The actors denote who is to perform at the intersection of every process and element. In the example of FIG. 15, the actors are each assigned a symbol (as shown in legend 1502) that would be appropriately placed at each point of intersection. Thus, the associations between the processes, elements, and actors define the scope.

In a further embodiment, each class is handled on a separate scope model, the combination of which would describe the total responsibilities of the actors.

Figure 16:
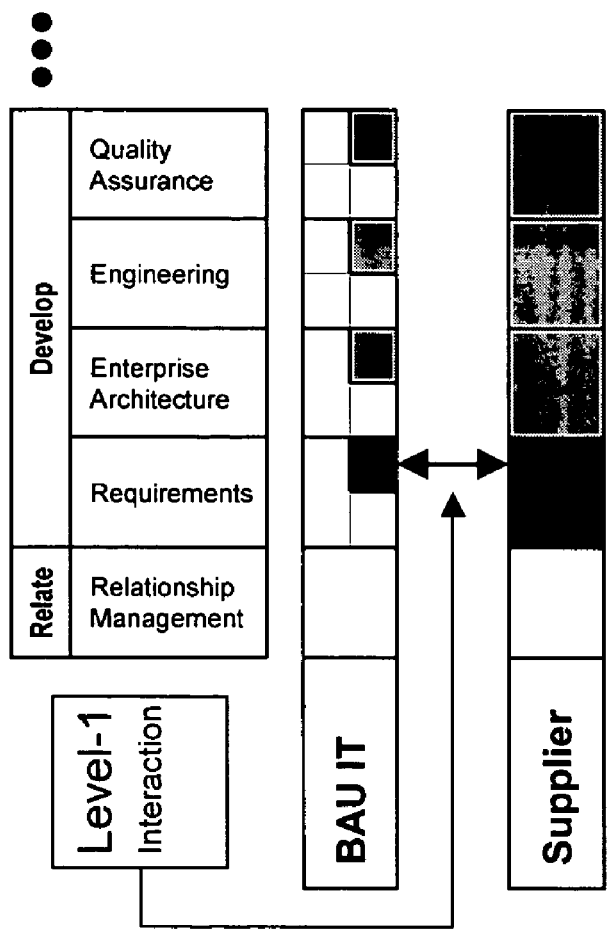
FIG. 16 is a schematic diagram of a level one interaction model, according to an embodiment of the present invention.

FIG. 16 illustrates a level one interaction model, according to an embodiment of the present invention. This level one interaction occurs when a function is sourced from client to supplier and when the linkage to or from the sourced process still resides with the client. As an example, if a client outsourced the requirement refinement portion of the overall requirement handling process, then the client would still need to interact with the supplier when handing the supplier the un-refined requirements, as well as when the supplier completed the refinement work and handed the client the results for its review.

While level one interactions are important to understand, they are not always at a sufficient level of granularity to be useful in discussing with the supplier how the supplier and client will handle the interaction. Accordingly, the present invention provides interaction models at a more granular level (level three) for those interactions that are of importance to the parties. According to one embodiment, level one interactions are developed into level three interaction models by drawing the applicable process maps, utilizing a swim-lane as a boundary, and documenting what moves across the boundary.

Figure 17:
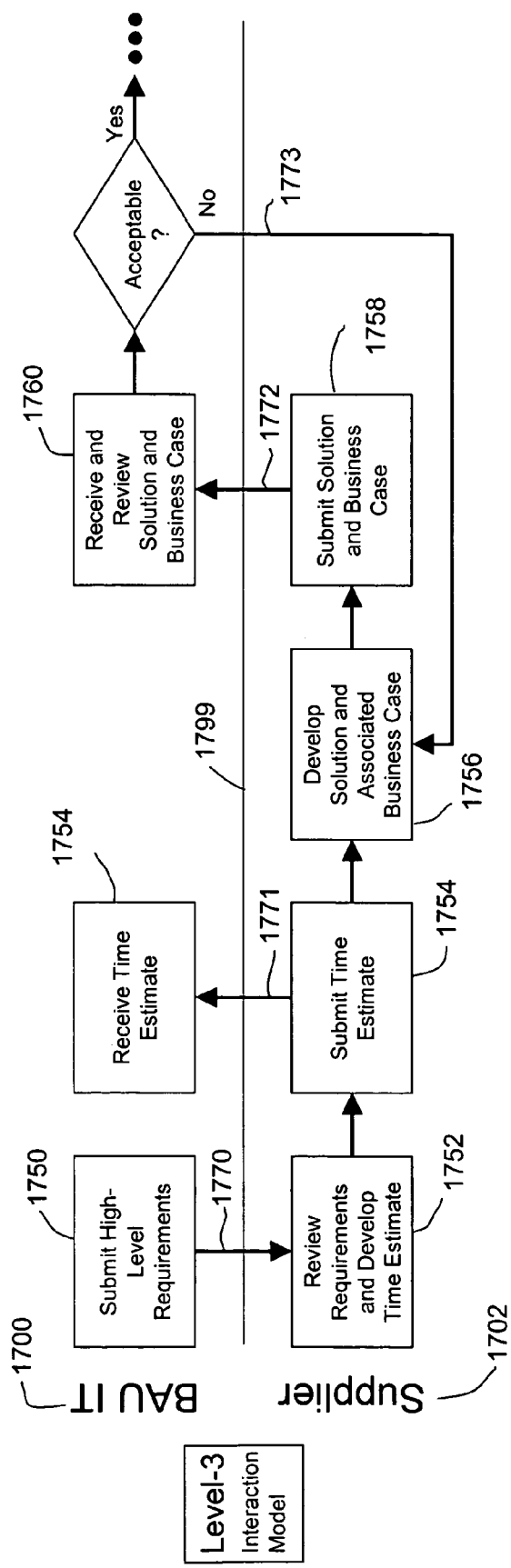
FIG. 17 is a schematic diagram that illustrates an exemplary interaction model created by developing process maps of an interaction, according to an embodiment of the present invention.

FIG. 17 illustrates an example of an interaction model created by developing process maps of an interaction, according to an embodiment of the present invention. Using a swim lane 1799 to denote the client 1700's and supplier 1702's handling of the various processes allows the parties to define the interaction at a level of detail that is sufficient for the client 1700 to understand what its responsibilities will be and for the supplier 1702 to adequately develop its solutions and pricing for the sourcing.

Using the process depicted in FIG. 17 as an example, in step 1750, the client 1700 would submit high-level requirements to the supplier 1702, who in step 1752 would review them and develop a time estimate for its completion of the requirements. The supplier 1702 would submit the time estimate to the client 1700 in step 1754 while continuing to develop the solution and associated business case in step 1756. Eventually, the supplier 1702 would submit the solution and business case to the client 1700 in step 1758, who, upon receipt, would determine in step 1760 whether it was acceptable or not. If the solution and business case is not acceptable, the process returns to step 1756 to continue developing the solution and business case. If the solution and business case is acceptable, the solution and business case is complete.

According to this embodiment, the use of process maps helps explain levels of detail that cannot be achieved by the scope model without adding many more processes. Although processes could be added to the scope model, such additions would result in a significantly larger and more complex scope model, as well as the insertion of client-specific processes into otherwise best practice processes. Thus, the use of process maps to describe client-specific activities is preferred.

In providing interaction models, the present invention helps avoid a situation in which a client and supplier fail to establish what was to occur in an interaction before a contract becomes effective. For example, in this situation, the client might pass a set of high-level requirements to the supplier. The supplier would review the document and then question the breadth of the requirements, which require the supplier to complete unanticipated work and result in extra charges. The client and supplier would likely have an argument. Moreover, the typical mechanism put in place to deal with such a conflict is a procedure manual, which unfortunately is not normally produced until six months into the deal. Thus, typically, the likelihood that the client and supplier reach agreement on the issue without a corresponding change in price is low.

Thus, according to an embodiment of the present invention, if an interaction is going to be problematic by nature, it is documented with a level three interaction model. However, in addition to developing the appropriate process maps, a further embodiment of the invention identifies what moves across the swim lane 1799 and documents its nature. According to this embodiment, boundary change interactions are documented for interactions that are important to the overall success of a larger process or are problematic by nature (e.g., high friction topics, high visibility operations, and infrequent occurrences).

As an example, referring again to FIG. 17, it is likely that of the four swim lane changes 1770, 1771, 1772, and 1773, two would be important to expose. Swim lane changes 1770 and 1772 in the process map appear to warrant such treatment, as the information contained in the relevant documents is of critical importance to both parties.

According to this embodiment, the interaction is described for these boundary change interactions (i.e., moving across the swim lane 1799). Table 1800 of FIG. 18 illustrates examples of the type of information that should be collected for each such interaction. In essence, table 1800 documents what moves across the border 1799, includes such details as the direction it is headed, the actors involved, and the contents. As an example, the descriptions should more than just indicate that the supplier will produce an annual architecture plan. Even online booksellers know that such a description would be insufficient for the sale of a $20 book. Accordingly, they tell the prospective buyers something about the book by providing a picture of the cover, a table of contents, and sample passages. As another example, if the interaction is a meeting, the description might include a detailed agenda for the meeting along with a listing of the people or departments to attend. The goal of the description is to ensure that the parties are not surprised by the interaction when it occurs.

A preferred embodiment of the present invention includes some or all of the interactions (e.g., process maps and descriptions) in the contract documents, although this would not be a requirement for all interactions.

Figure 19:
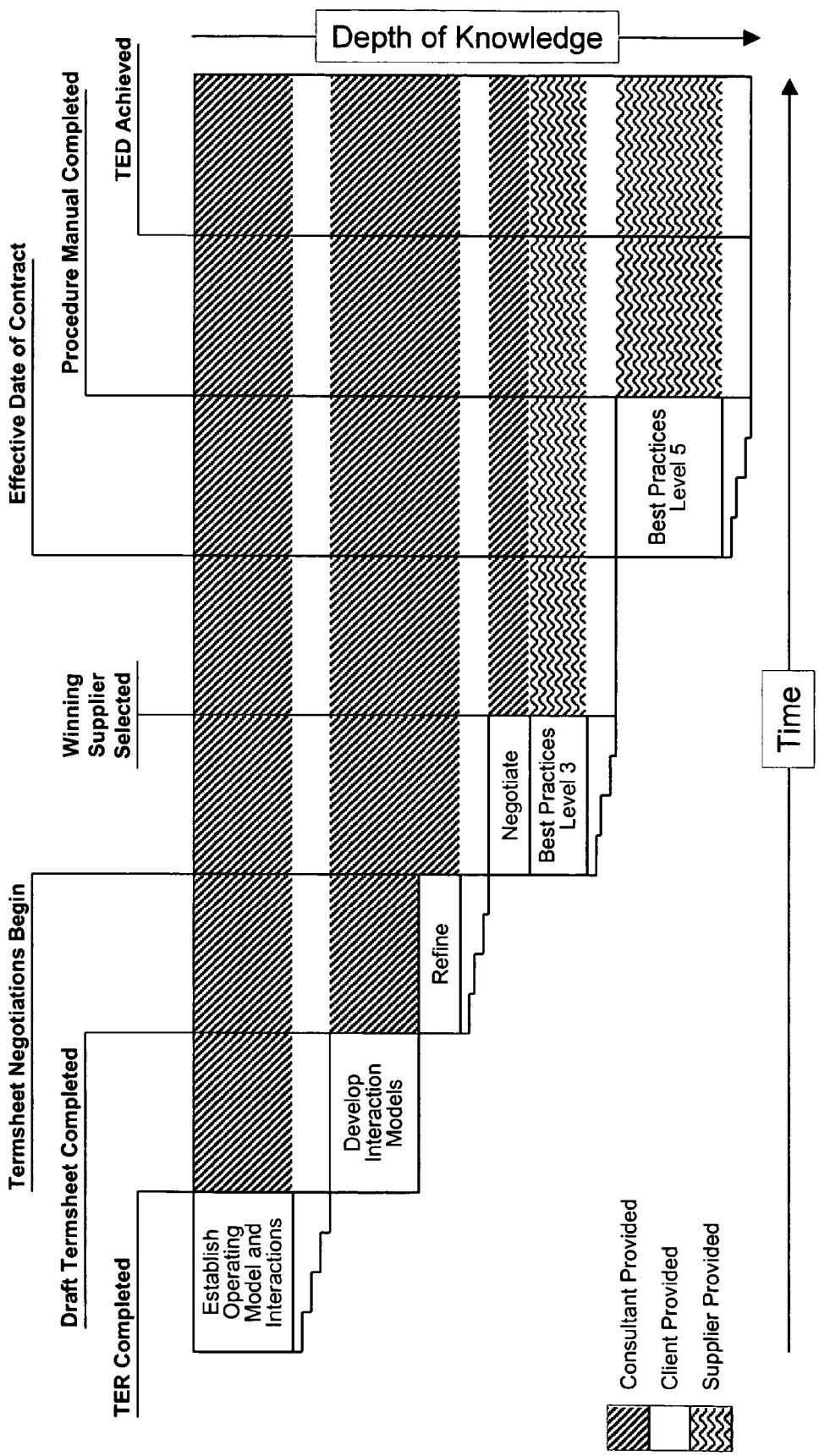
FIG. 19 is a schematic diagram that depicts how interactions are established relative to the depth of knowledge required and to the stage of sourcing, according to an embodiment of the present invention.

FIG. 19 is a schematic diagram that depicts how interactions are established relative to the depth of knowledge required and to the stage of the sourcing, according to an embodiment of the present invention. The interactions involve participation by an outsourcing consultant, a client of the outsourcing consultant, and a supplier. The interactions occur along a timeline that includes the following stages: TER completed, draft term sheet completed, term sheet negotiations begin, winning supplier selected, effective date of contract, procedure manual completed, and TED achieved. As shown by the shading in FIG. 19, a consultant's participation involves establishing an operating model and interactions from TER completion through the achievement of the TED, developing interaction models from draft term sheet completion through the achievement of the TED, refining the term sheet from the completion of the draft term sheet through the achievement of the TED, and negotiating from the beginning of term sheet negotiations through to the achievement of the TED. The supplier's participation involves providing best practices from the negotiation of the term sheet through the achievement of the TED. The client participates throughout all of the processes, except perhaps during the development of interaction models, which is preferably completed solely by the consultant.

As an example of this interaction, a consultant would develop the operating model (i.e., level 1 interactions) along with input from the client. At this point, the TER would be completed. Based again on the experiences of the consultant as further refined by the client, the level three interaction models would be documented during the development of the term sheet. In the course of negotiating the term sheet with the supplier(s), the consultant would again assist in the development of negotiated level three interactions, which the supplier(s) would further enhance by describing their level three best practices, which, with client feedback, would then produce the deepest set of level three knowledge regarding such client-specific interactions. Until a supplier is selected and the transaction becomes effective, there would be no change in the depth of knowledge regarding the interactions. However, immediately following the transaction effective date, the supplier would begin development of the client-specific procedure manual. Development of the manual would likely leverage client-attended workshops regarding various operational functions, as well as the supplier's level five best practices. If all of this were then correctly documented in the procedure manual, then it would then contain the deepest set of knowledge regarding client-supplier interactions and would be updated as the interactions changed.

In an embodiment of the present invention, the measurement requirements of a transaction are separated from the levels of service to be achieved. This separation reduces the confusion that has resulted from the outsourcing industry's use of the phrase "service level" to denote what is measured, as well as the level at which the service is to be performed. Thus, according to this embodiment, "service measure" indicates what is being measured (e.g., transaction response time and break/fix time) and "service level" indicates the level that is to be achieved for a given service measure (e.g., ≦800 milliseconds and one business day).

Also in accordance with this embodiment, there are three types of service measures: temporal, availability, and quality. Temporal measures deal with services that are measured in time (e.g., seconds, business days, or a particular date). Availability measures deal with the percentage of time that the services were available for use. Quality measures deal with all other service measures, such as the objective or subjective components of services (e.g., number of occurrences, failure rates, and resolutions rates).

The above definitions provide a common construct for all service measure/level information, which enables the population of a service measure knowledgebase tied to value chain and which provides client value. FIG. 20 is a table 2000 that shows exemplary relevant fields associated with given service measures. In addition to the value that a consolidated knowledgebase of service measures provides clients (i.e., a listing of service measures with expected ranges for service levels), the service measure/level construct provides a client the ability to link each service measure to a process along the value chain (which can be leveraged by tools built to automate much of the development of service measures and service levels). Using the second service measure shown on table 2000 as an example (Business Solution Inaccuracy), the second service measure can be linked to value chain process 2.1.1 (Identify and Document Requirements—see FIG. 15). In an embodiment of the present invention, when a client needs to measure a process, the client clicks on the process in question, in response to which a catalog of the service measures is displayed. The invention then assists the client in either selecting one of the stock measures or customizing one of the service measures to better reflect their needs and/or environment (discussed below).

Figure 21:
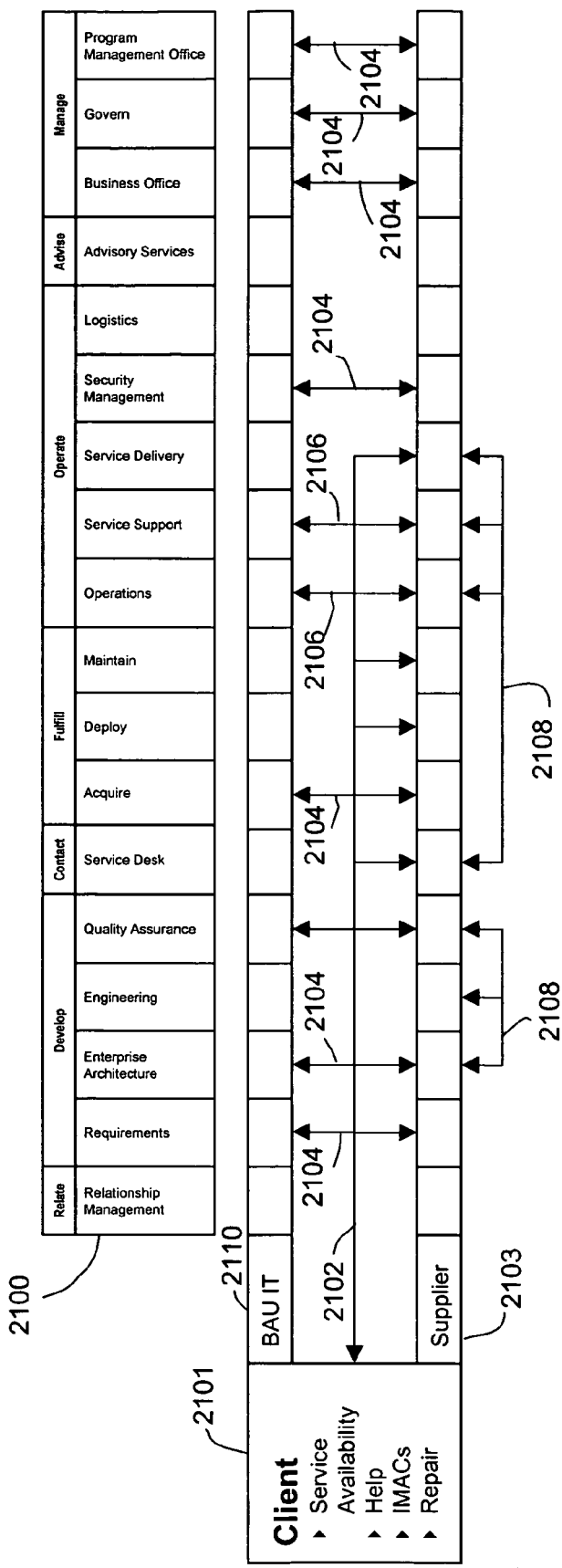
FIG. 21 is a schematic diagram that depicts an exemplary method for measuring interactions between a client and supplier, in terms of both the client's and supplier's value chain, according to an embodiment of the present invention.

FIG. 21 is a schematic diagram that depicts an exemplary method for measuring interactions between a client 2101 and supplier 2103, in terms of both the client's and supplier's value chain 2100, according to an embodiment of the present invention. In this particular example, there are four types of interactions between client 2101 and supplier 2103. Interactions 2102 indicate interactions in which the client, as a customer of IT, is the recipient of a supplier produced good or service. Interactions 2104 indicate interactions in which BAU IT 2110 (of the client) is involved in a high-friction interaction with the supplier 2103. Interactions 2106 indicate interactions in which BAU IT 2110 is involved in a commonplace or highly operational interaction with the supplier 2103. Interactions 2108 indicate interactions that exist solely within the supplier's domain (i.e., intra-actions). These interactions 2108 are represented by linkages along the value chain between the supplier's business processes.

In light of these different types of interactions, an embodiment of the present invention applies principles of outsourcing, as well as change management, to determine how interactions should be measured. Accordingly, interactions 2102 are measured on an end-to-end basis, as the customer does not care about intervening steps. Interactions 2104 are measured closely, as they are high-friction by definition and represent important parts of the problematic boundary change interactions. Interactions 2106 are measured less closely, and perhaps not all, as they represent frequent commonplace interactions. In other words, interactions 2106 are preferably only measured if such measures would produce value. Finally, interactions 2108 are not measured because they are internal to the supplier (i.e., do not measure what is not a client/supplier interaction—measure the "what," not the "how").

Thus, as shown in FIG. 21, an important aspect of the present invention is the notion that interactions are what should be measured. In other words, the present invention measures the cross border activities (interactions), not the activities or processes that occur fully within the supplier's domain. In addition, although FIG. 21 depicts level one interactions, other interactions would be exposed through the process of developing level three interaction models.

A further aspect of this embodiment of the present invention accounts for seven interactions that are generally believed to be high-friction interactions: requirements; architecture; standards; procurement; security; governance and project management. Specifically, in addition to developing interaction models for these processes, this further embodiment develops service measures to help ensure compliance.

With service measures developed as a result of interactions, an embodiment of the present invention determines if the resultant service measures provide sufficient coverage for the client. FIG. 22 is table 2200 that shows a method for evaluating resultant service measures against the coverage, according to this embodiment of the present invention. As shown, table 2200 plots the service measures along the value chain, which conveniently indicates which of the processes are measured. This does not mean, however, that all processes sourced to the supplier must be measured, as (1) it might not be necessary to measure what the supplier does fully within its domain; (2) not all processes produce interactions; and (3) not all interactions need to be measured. However, by plotting the service measures along the value chain, it is much easier for a client to consider the consequences of its actions than doing so simply by thinking about the transaction.

In a further embodiment, a custom span is used in table 2200 to reflect business units and/or geographical differences. By adding a custom service level span to the value chain processes, a process-span matrix is created that can be used to populate the applicable service levels for the relevant business units and geographies.

In a further embodiment, in addition to presenting the service measures and service levels in table 2200, the present invention provides a tool that can manipulate the table to show just a certain kind (or kinds) of service measure (e.g., temporal, availability, or quality) to further facilitate the process of determining adequate service measure coverage.

In supporting a transaction for a client, the present invention provides a method for outsourcing that provides flexibility in customizing the transaction for the client. New processes can be conveniently added to the value chain to account for new activities. While the value chain processes are preferably not altered, processes that are unique to the client are inserted appropriately into the value chain. In addition, the span, by definition, is specific to a client's environment. With regard to the scope model, by populating the process-span matrix with actors, a transaction specific for a given client can be created.

The elements are also customizable. While it is unlikely that client, server, or enabling elements will differ much from client to client, the third party, application, and real estate elements are all highly specific to a given client. In addition, the attributes personalize elements for a client (e.g., requirements and standards). In other words, the attributes describe client-specific standards for common elements.

Interactions are another source of customization. The interactions document what moves across the client-supplier boundary. For example, interactions handle such client-specific requirements as "attend progress meeting" or "publish to the reporting system."

Interaction models are also specific to a client and its supplier. These interaction models describe, in level three terms, how the client and supplier will interact.

The TED is also particular to the client, in describing what will be achieved for the client.

The service measures and service levels are also dependent on the client. These service measures and levels determine what is important to the client and at what level the services will be performed by the supplier.

Figure 23:
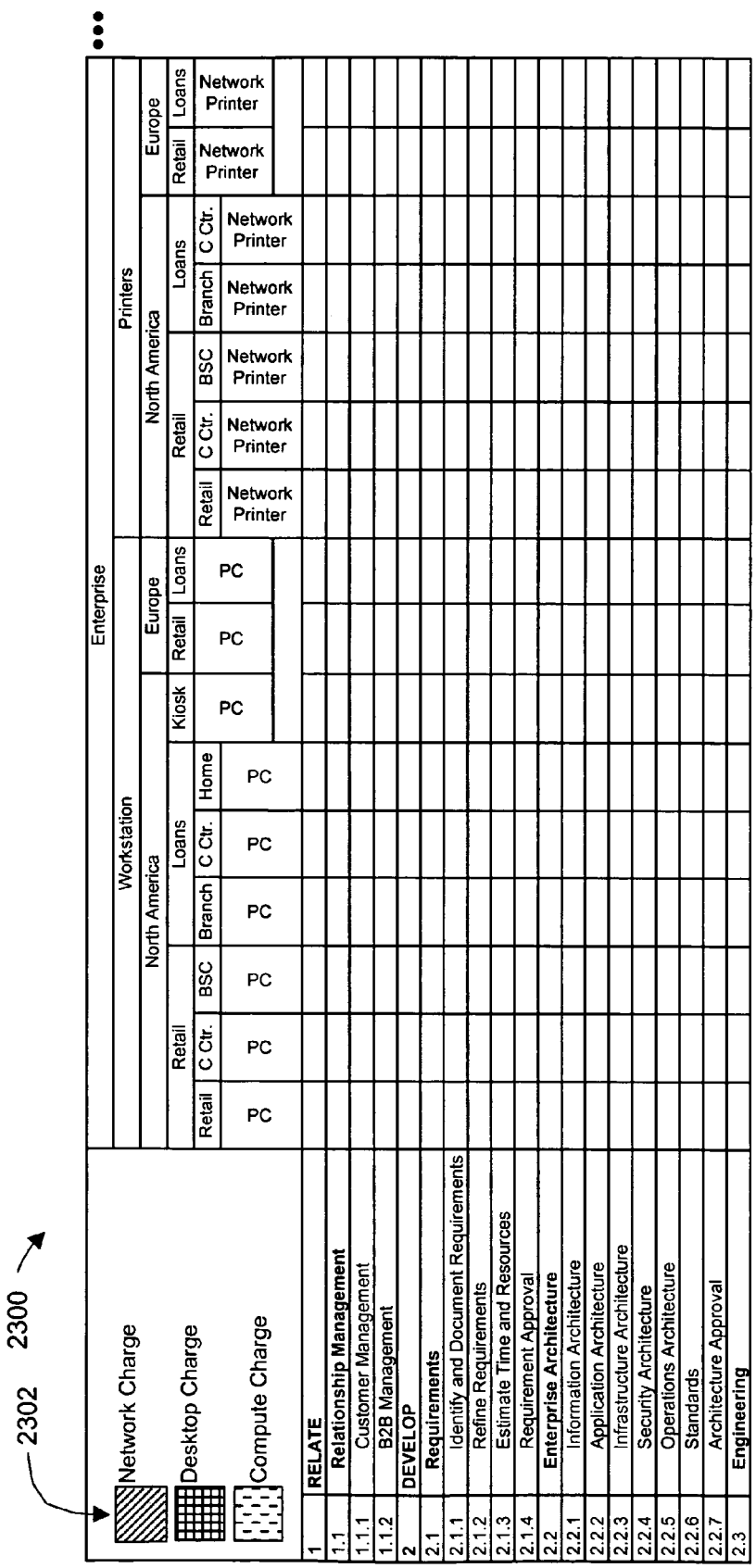
FIG. 23 is an exemplary price model, according to an embodiment of the present invention.

As a further embodiment of the present invention, FIG. 23 illustrates an exemplary price model 2300, which relates prices to associated processes and elements. In this example, services are linked to price paid by coding (e.g., with shading 2302, shown in FIG. 23) the process-span matrix according to the types of charges (e.g., network charge, desktop charge, and compute charge). This price model 2300 is a valuable tool for clients, who routinely complain that suppliers render invoices for supposedly out-of-scope work that the clients believe to be in scope. Using the price model 2300, it is possible to code each cell with a shade that corresponds to a given pricing construct (e.g., desktop, network, and mainframe). Doing so achieves two primary benefits: (1) there will be a direct correlation between each intersection on the cost model and a pricing construct; and (2) intersections can only be coded once (i.e., the same intersection will only be paid for by one pricing construct). In other words, price model 2300 takes the mystery out of what services are involved in a pricing construct.

A further embodiment of the present invention provides a graphical user interface (GUI) tool that enables the creation and manipulation of a process-span matrix. In particular, the GUI tool enables a user to select the type of information that is displayed at the intersections of the process-span matrix, to display, for example, a scope model or a cost model. In this manner, a user can conveniently switch between the different types of information that can be associated with each intersection, such as human resources, cost, and service level.

Figure 24:
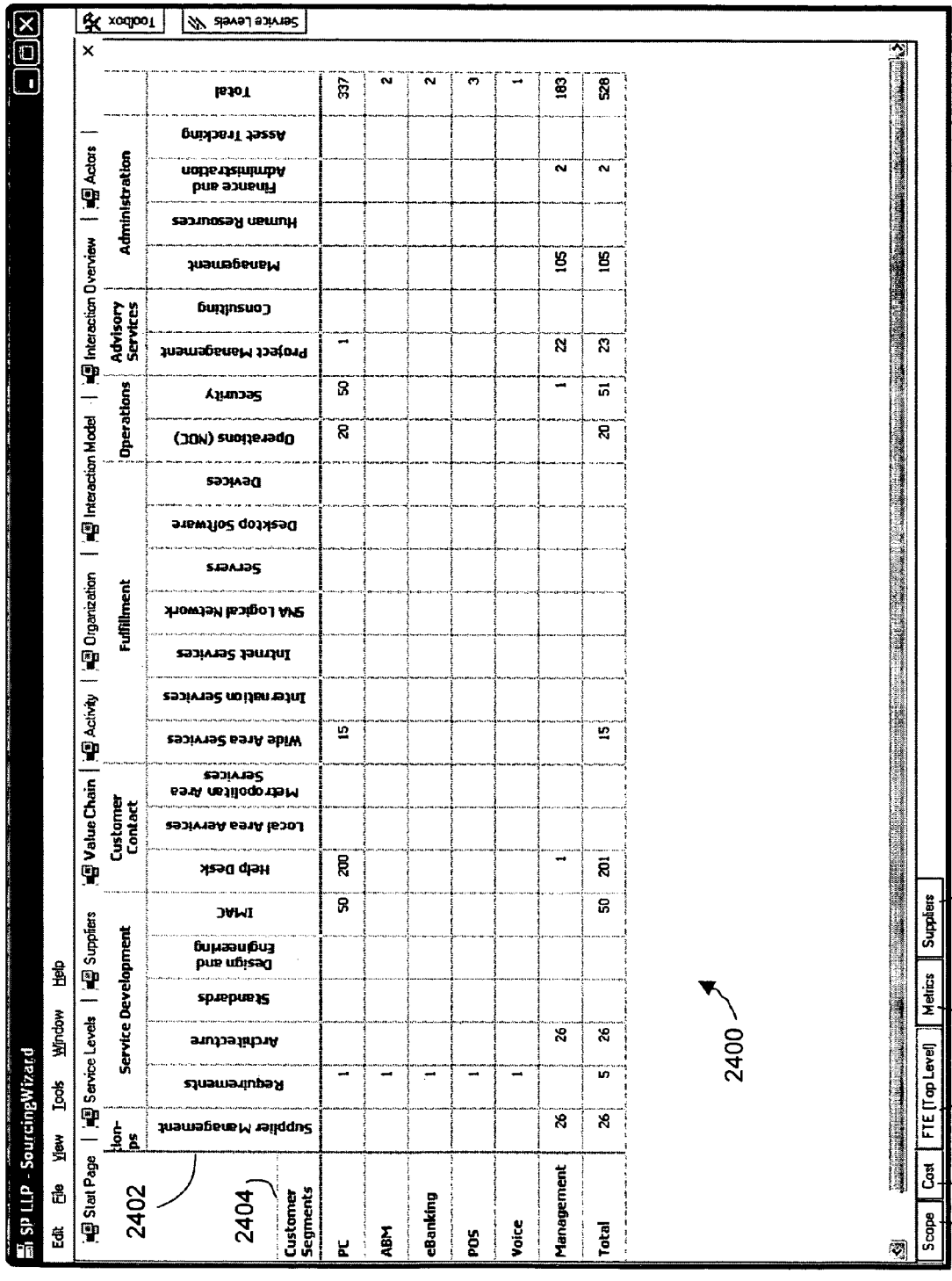
FIG. 24 is a screen image of an exemplary graphical user interface tool that enables the creation and manipulation of a process-span matrix and the population of data at the intersection of processes and elements to create various models, according to an embodiment of the present invention.

FIG. 24 is a screen image of an exemplary graphical user interface tool that enables the creation and manipulation of a process-span matrix and the population of data at the intersection of processes and elements to create various models, according to an embodiment of the present invention. As shown, the GUI tool displays a process-span matrix 2400 having a plurality of value chain processes 2402 and a span 2404 of customer segments. In the view shown in FIG. 24, the intersections of the process-span matrix 2400 indicate the number of elements needed for each process. This view can be changed, however, by clicking on the tabs for scope 2410, cost 2412, human resources or FTE (full time equivalent) 2414, metrics 2416, or suppliers 2418. For each of these views, a different characteristic of the associated process and element is displayed at the intersections of the process-span matrix 2400. For example, for cost 2412, a dollar amount would be displayed, which corresponds to the cost of completing the process with the elements. As another example, the view for scope 2410 would indicate whether a particular intersection is within or outside of the scope of an outsourcing. As another example, the view for suppliers 2418 would show the name of the suppliers responsible for each intersection.

Overall, as described above, the present invention provides a method for approaching large-scale, complex outsourcing transactions. The method, through consistent application of a value chain construct, provides a rigorous yet flexible structure that can be applied to the management of the entire sourcing lifecycle: strategy; transaction; and operation. It can be applied equally to outsourcings and their renewals/renegotiations, as well as consolidations, acquisitions, and divestitures.

An important aspect of the present invention is the construction of an operating model for the entirety of the operation, which is the "retained" as well as the "sourced" components, so all service delivery actors (both internal and external) can be identified and allocated to specific functions. In contrast, the traditional scoping models focus solely on the components to be sourced and do not provide good organizational context within which broad-based sourcing strategies or transactional decisions can be assessed.

Another important aspect of the present invention involves expressing the operating model in terms of the full spectrum of processes specific to the organization's operations (i.e., a value chain). An exemplary IT value chain can contain over seventy processes (e.g., change management, security architecture, standards development, and communications operations). For each process, the model identifies the elements on which such processes are enacted (e.g., PCs, telephones, routers, circuits, servers, applications, and third-party contracts).

Another important aspect-of the present invention involves defining the processes, wherever possible, using terminology provided by standards-based organizations (e.g., ITIL, PMI, SEI, and ITGI). Feedback from outsourcing suppliers, as well as actual experience, indicates this approach can dramatically shorten the time taken to negotiate the scope of services.

Another important aspect of the present invention involves applying the operating model to a specific outsourcing transaction, such that its scope is defined in terms of the processes and elements (and characteristics of associated processes and element, such as actors and cost), rather than by traditional service towers. This approach provides a complete mapping of how the sourced functions will fit into the customer's organization so the areas of interaction between supplier(s) and customer can be readily discerned. Once discerned, the level of complexity and risk can be evaluated and, if necessary, either the scope model can be adjusted or interaction models can be designed prior to the contract being finalized. This helps ensure that the supplier(s) is accountable for end-to-end responsibility for outsourced processes and thus reduces post-signing implementation risk.

Another important aspect of the present invention facilitates the capture of data, such as personnel, equipment, applications, and third party contracts, using the same organizational structure (as defined by the process-span matrix) in which the scope is defined. This is an improvement over the traditional model because it aligns the data with the customer's view of its existing organization, making its collection easier, and providing the precise data needed by the supplier to design informed service and price proposals.

Another important aspect of the present invention organizes transactions along process lines, which makes it easier to identify where service level requirements are needed and/or determine if adequate service level coverage has been developed. Moreover, it provides a mechanism to link pricing to processes and elements, thereby resolving some of the more heated customer/supplier discussions.

Another important aspect of the present invention provides a construct based on transfer, transition, and transformation. This construct provides customers with a tool to specifically express their desired outsourcing objectives at an appropriate level of detail to help ensure supplier proposals are responsive to their needs without unduly restricting the suppliers' creativity in producing optimized solutions (e.g., process, people, organization, technology, geography, and measurement). The construct assists customers in the articulation of their desired outsourcing objectives at the strategic, tactical, and operational levels (collectively the "Target Environment Requirements" or "TER") and structures the suppliers' portrayal of their solutions ("Target Environment Design" or "TED") across time and the relevant dimensions of change (e.g., process, people, organization, technology, geography, and measurement). As indicated in FIG. 9, the transfer, transition, and transformation construct provides, depending on the stage of sourcing in question, the rationale for the outsourcing and its objectives.

Another important aspect of the present invention addresses the substantial shortcomings associated with reliance on governance alone as the cure for a poor relationship. Simply put, governance models are insufficient to resolve the operational issues that tend to give rise to a bad relationship. Accordingly, the method of the present invention identifies the areas of high friction as a result of sourcing decisions and utilizes detailed interaction models to precisely design and enhance the desired manner of exchange.

Although, for illustration purposes, portions of this specification describe the present invention in the context of information technology outsourcing (ITO), one of ordinary skill in the art would appreciate that the invention is useful for other outsourcings, as well as other situations in which an organization's operations must be analyzed. For example, in addition to the applying a value chain to information technology outsourcing, the present invention could be applied to what are generally referred to as business process outsourcings (BPOs). BPOs include, for example, situations in which a company outsources its human resource functions (HR outsourcing), its finance and accounting (or administration) functions (F&A outsourcing), its procurement functions, call centers (both inbound and outbound), or other types of back- and mid-office functions (e.g., insurance claims processing and item (or check) processing). In addition, beyond outsourcings, the present invention could be used to analyze mergers, acquisitions, and divestitures. For this reason, and notwithstanding the particular benefits associated with using the present invention in ITO, the systems and methods described herein should be considered broadly useful for any situation in which a company desires to analyze a business operation to determine who is going to do what and where.

In accordance with an embodiment of the present invention, instructions adapted to be executed by a processor to perform a method are stored on a computer-readable medium. The computer-readable medium can be a device that stores digital information. For example, a computer-readable medium includes a read-only memory (e.g., a Compact Disc-ROM ("CD-ROM") as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for illustrating interactions between an organization and a supplier participating in an outsourcing comprising:
   receiving, from a user, input defining a value chain including a plurality of processes;
   receiving, from the user, input defining a plurality of elements, wherein one or more of the plurality of elements is subject to one or more of the plurality of processes;
   displaying, for each process, the one or more elements subject to the process;
   receiving, from the user, input identifying at least one actor assigned to each process and the one or more elements subject to the process, wherein the at least one actor is either the organization, the supplier for the organization, or a third party to the organization and the supplier;
   displaying, for each process, an actor responsible for completing the process with the one or more elements subject to the process; and
   displaying, along the value chain, interactions between the organization and the supplier, said interactions defining a sequence by which to complete the plurality of processes and information that is to be passed between the organization and the supplier;
   mapping, in a matrix, the plurality of processes against the plurality of elements;
   populating at least some intersections in the matrix between the mapped plurality of processes and the mapped plurality of elements with the actor responsible for the corresponding process and the one or more elements subject thereto; and
   displaying the matrix.

2. The method of claim 1, wherein displaying the matrix on a single display comprises displaying the matrix on a computer user interface.

3. The method of claim 1, wherein said one or more of the plurality of elements are grouped by class, business unit, and geography of the organization.

4. The method of claim 3, wherein the class defines commonalities among a group of the plurality of elements.

5. The method of claim 1, wherein the outsourcing comprises an information technology outsourcing, and wherein said at least one element includes one of: a client, a server, an enabler, or an application.

6. The method of claim 1, wherein the actor that is responsible for completing the respective process with the one or more elements subject to the process includes an actor that is responsible for furnishing the respective process and the one or more elements.

7. The method of claim 6, wherein the actor is the supplier, and wherein the method further comprises including a representation of the matrix as part of a contract between the organization and the supplier for the supplier's furnishing of the respective process and the one or more elements.

8. The method of claim 6, wherein the actor comprises one of: a first company participating in a merger or a second company participating in the merger.

9. The method of claim 1, wherein at least one of the plurality of processes is defined according to an industry standard.

10. The method of claim 1, wherein the plurality of processes includes relate, develop, contact, fulfill, operate, advise, and manage.

11. The method of claim 1, wherein the plurality of processes comprises one of: information technology functions, human resource functions, finance and accounting functions, procurement functions, call center functions, back-office functions, or mid-office functions.

12. The method of claim 1, wherein the interactions comprise process maps indicating a swim lane boundary across which the interactions occur.

* * * * *